(12) United States Patent
Hayashino et al.

(10) Patent No.: US 7,085,233 B2
(45) Date of Patent: Aug. 1, 2006

(54) COMMUNICATIONS CONTROL METHOD

(75) Inventors: Hiroshi Hayashino, Himeji (JP);
Kazuhiro Ando, Katano (JP);
Shinichiro Ohmi, Toyono-gun (JP);
Yasuo Harada, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1034 days.

(21) Appl. No.: 09/972,962

(22) Filed: Oct. 10, 2001

(65) Prior Publication Data

US 2002/0041586 A1 Apr. 11, 2002

(30) Foreign Application Priority Data

Oct. 11, 2000 (JP) ............................. 2000-310392

(51) Int. Cl.
*H04L 12/56* (2006.01)
(52) U.S. Cl. ...................................... 370/235; 370/389
(58) Field of Classification Search .................. None
See application file for complete search history.

(56) References Cited

U.S. PATENT DOCUMENTS 6,018,816 A * 1/2000 Tateyama ..................... 714/746
6,307,974 B1 * 10/2001 Tsujimoto .................... 370/352
2003/0063601 A1 * 4/2003 Niida et al. .................. 370/360
2004/0246959 A1 * 12/2004 Duckwall et al. ............ 370/389

FOREIGN PATENT DOCUMENTS

EP 0 939 510 9/1999

OTHER PUBLICATIONS

IEEE: "IEEE Standard for a High Performance Serial Bus—Link layer specification" IEEE STD 1394-1995, Jul. 1996, XP002287654.

* cited by examiner

*Primary Examiner*—Chi Pham
*Assistant Examiner*—Anh-Vu Ly
(74) *Attorney, Agent, or Firm*—Wenderoth, Lind & Ponack, L.L.P.

(57) ABSTRACT

In serial transmission of a mixture of isochronous data and anisochronous data, communications through a transmission path with a high ratio of occurrence of transmission errors may disturb images during streaming reproduction and produce noise in sound. To solve this problem, the isochronous data that has not been successfully received is retransmitted by using an anisochronous region. Thus, a transmission error of the isochronous data can be reduced without impairment of isochronous characteristics of the data.

22 Claims, 21 Drawing Sheets

FIG. 8

| DEDICATED REGION INFORMATION PACKET HEADER | | |
|---|---|---|
| ISOCHRONOUS DATA NUMBER 1 | | |
| DATA LENGTH | NUMBER OF BLOCKS | ACK TRANSMISSION TIME |
| SEQUENCE NUMBER 1 | BLOCK LENGTH 1 | DATA TRANSMISSION TIME 1 |
| SEQUENCE NUMBER 2 | BLOCK LENGTH 2 | DATA TRANSMISSION TIME 2 |
| SEQUENCE NUMBER 3 | BLOCK LENGTH 3 | DATA TRANSMISSION TIME 3 |
| SEQUENCE NUMBER 4 | BLOCK LENGTH 4 | DATA TRANSMISSION TIME 4 |
| ISOCHRONOUS DATA NUMBER 2 | | |
| DATA LENGTH | NUMBER OF BLOCKS | ACK TRANSMISSION TIME |
| SEQUENCE NUMBER 1 | BLOCK LENGTH 1 | DATA TRANSMISSION TIME 1 |
| SEQUENCE NUMBER 2 | BLOCK LENGTH 2 | DATA TRANSMISSION TIME 2 |
| ISOCHRONOUS DATA NUMBER 3 | | |
| DATA LENGTH | NUMBER OF BLOCKS | ACK TRANSMISSION TIME |
| SEQUENCE NUMBER 1 | BLOCK LENGTH 1 | DATA TRANSMISSION TIME 1 |
| ISOCHRONOUS DATA NUMBER 4 | | |
| DATA LENGTH | NUMBER OF BLOCKS | ACK TRANSMISSION TIME |
| SEQUENCE NUMBER 1 | BLOCK LENGTH 1 | DATA TRANSMISSION TIME 1 |
| CRC | | |

FIG. 12

| RESPONSE PACKET HEADER ||
|---|---|
| ISOCHRONOUS DATA NUMBER ||
| SEQUENCE NUMBER 1 | RECEPTION STATE 1 |
| SEQUENCE NUMBER 2 | RECEPTION STATE 2 |
| ⋮ | ⋮ |
| SEQUENCE NUMBER N | RECEPTION STATE N |
| CRC ||

FIG. 16

| GLOBAL INQUIRY PACKET HEADER ||
|---|---|
| TRANSMISSION TERMINAL ADDRESS 2 | RECEPTION TERMINAL ADDRESS 1 |
| TRANSMISSION TIME t1 ||
| TRANSMISSION TERMINAL ADDRESS 3 | RECEPTION TERMINAL ADDRESS 1 |
| TRANSMISSION TIME t2 ||
| TRANSMISSION TERMINAL ADDRESS 3 | RECEPTION TERMINAL ADDRESS 4 |
| TRANSMISSION TIME t3 ||
| TRANSMISSION TERMINAL ADDRESS 5 | RECEPTION TERMINAL ADDRESS 4 |
| TRANSMISSION TIME t4 ||
| CRC ||

FIG. 17

| GLOBAL RETRANSMISSION INSTRUCTION PACKET HEADER ||
|---|---|
| TRANSMISSION TERMINAL ADDRESS 1 | RECEPTION GROUP 1 |
| TRANSMISSION TIME t5 ||
| TRANSMISSION TERMINAL ADDRESS 4 | RECEPTION GROUP 2 |
| TRANSMISSION TIME t6 ||
| CRC ||

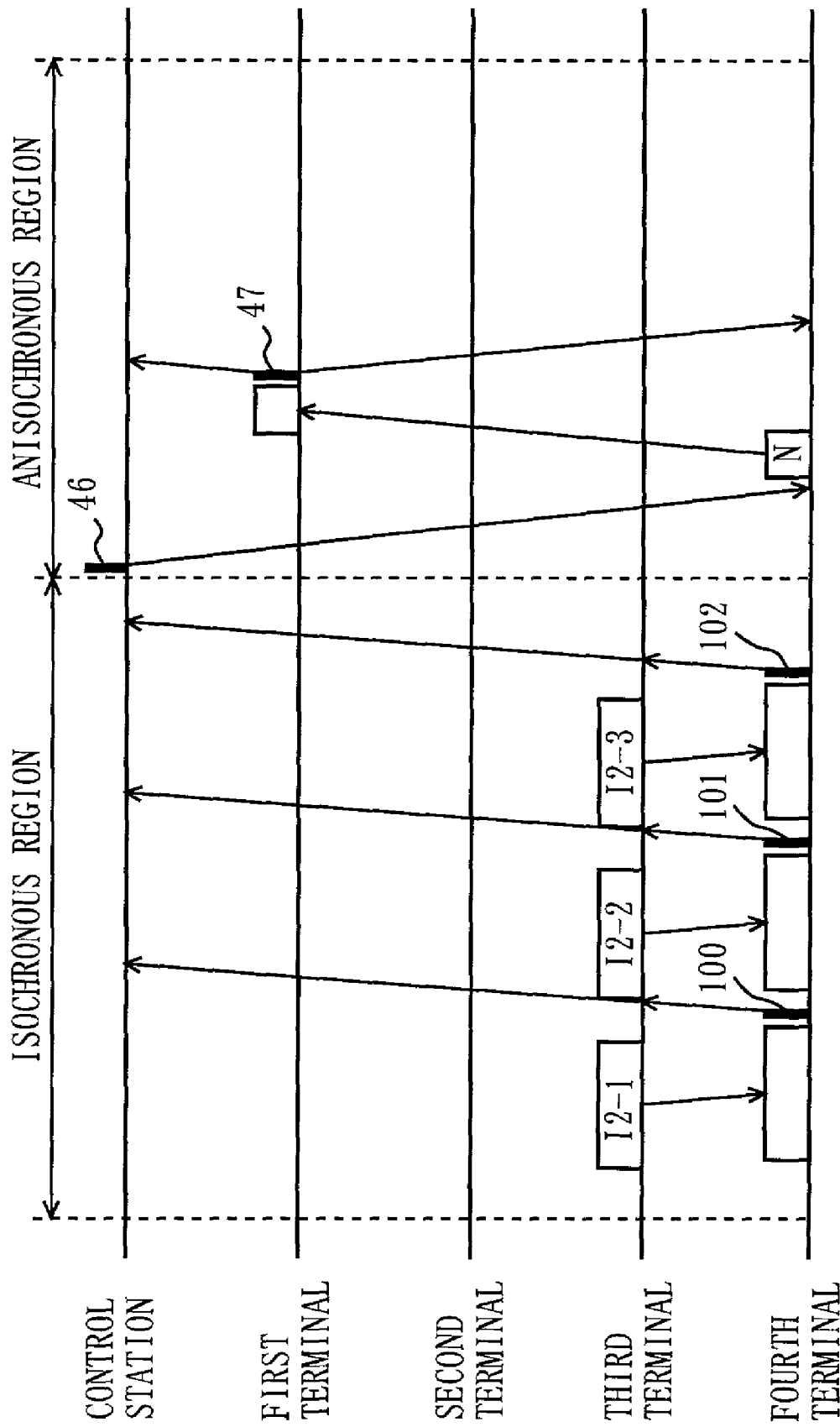

COMMUNICATIONS CONTROL METHOD

BACKGROUND OF THE INVENTION

1. Field of the Invention

The present invention relates to communications control methods and, more specifically, to a method for controlling communications among a plurality of terminals coupled to each other to form a network for serial transmission of a mixture of isochronous data and anisochronous data.

2. Description of the Background Art

In recent years, computers, peripheral devices, digital video devices, and other components are often connected to each other in homes and offices to form a local area network. On the network of this type, a mixture of isochronous data recurring at periodic time intervals (for example, video and audio data for streaming reproduction) and anisochronous data (for example, burst-like communications data) is transmitted in serial.

One example of the known standards for serial transmission of such a mixture is IEEE 1394. In IEEE 1394, all components forming a network are under communications control as described below.

FIG. 23 is a diagram showing an example of the structure of a conventional local-area network 209 that complies with the IEEE 1394 standard. FIG. 24 is a schematic diagram showing a conventional communications control method according to the IEEE 1394 standard. An example of the structure of a communications control cycle according to the IEEE 1394 standard is shown in (A) of FIG. 24, and an example of communications control carried out on the network of FIG. 23 is shown in (B) of FIG. 24.

In FIG. 23, the conventional network 209 includes a controller 210, a digital video player 211, a digital television 212, a set-top box (hereinafter, STB) 213, and a computer 214. These components 210 to 214 are connected in serial (or in tree shape) to each other via a cable that complies with IEEE 1394. In the network 209, the controller 210 controls the other components 211 to 214.

In the above structured network 209, assume herein that isochronous data "I1" is going to be transmitted from the digital video player 211 to the digital television 212; isochronous data "I2" is going to be transmitted from the STB 213 to the computer 214; and anisochronous data "N" is going to be transmitted from the computer 214 to the digital video player 211.

In IEEE 1394, as shown in (A) of FIG. 24, a control time is divided into predetermined cycles (for example, every 125 μs), and each cycle has a predetermined isochronous region of a predetermined time length (for example, 100 μs at maximum). The isochronous region is further divided into plural (two, in this example) regions. These two regions are respectively assigned to the components having isochronous data to be transmitted. In the example, one divided region is assigned, as a dedicated region (channel 1), to the digital television 212, while the other divided region is assigned, as a dedicated region (channel 2), to the STB 213.

As shown in (B) of FIG. 24, before the start of transmission, the controller 210 reports, to each component, information 200 about the dedicated regions assigned to these components. The information 200 includes times when each isochronous data is to be transmitted. When transmission starts and enters into the cycle, the controller 210 first transmits a packet 201 indicating the start of the cycle to each component. Upon receiving the cycle start packet 201, the components having the isochronous data to be transmitted (here, the digital video player 211 and the STB 213) transmit the isochronous data (I1 and I2, respectively) by using the dedicated region of their own (channel 1 and channel 2, respectively).

When the procedure exits the isochronous region, the controller 210 provides a transmission instruction 202 to the component having the anisochronous data (here, the computer 214). Upon receiving the instruction from the controller 210, the computer 214 transmits the anisochronous data (N).

Next, the destination of the anisochronous data (N) (here, the digital video player 211) receives the anisochronous data, and then returns a response packet 203 indicating whether or not the data has been successfully received, to the data originating terminal (the computer 214) and the controller 210. Upon receiving the response packet 203 from the computer 214, the controller 210 determines whether or not retransmission is required. In this example, the transmitted response packet 203 indicates that the data has been successfully received. Therefore, the controller 210 determines that retransmission is not required. Then, when the procedure exits the cycle and then enters into another, the controller transmits a packet indicating the start of the next cycle to each terminal (such packet transmission procedure is not shown in FIG. 24), and then the procedure is repeated similarly thereafter.

On the other hand, if the response packet 203 returned from the digital video player 211 indicates a reception error, the controller 210 transmits, to the computer 214, an instruction for retransmitting the anisochronous data (N). Then, the digital video player 211 returns response packets to the computer 214 and the controller 210. If the response packet from the digital video player 211 indicates a reception error, the controller 210 again instructs the computer 214 to retransmit the data (such retransmission procedure is not shown in FIG. 24).

As such, according to the IEEE 1394 standard, the control time is divided into cycles, and each cycle has an isochronous region of a predetermined time length allocated. This isochronous region is further divided into dedicated regions to be assigned to the components having isochronous data. Therefore, each of these components can transmit the isochronous data one time per cycle. Consequently, the isochronous characteristics can be kept.

On the other hand, the region other than the isochronous region in each cycle is an anisochronous region, where the components having anisochronous data to be transmitted are controlled (asynchronous control) so that they carry out transmission one after the other. Thus, serial transmission of mixed isochronous and anisochronous data can be achieved.

In IEEE 1394, even if a reception error of the isochronous data occurs, retransmission control is not carried out. Instead, the ratio of error occurrence is reduced to less than a predetermined value by restricting the length of a cable connecting the components together to less than a predetermined length (4.5 m if a conductor cable). With the ratio of error occurrence less than the predetermined value, quality deterioration in image and sound can be suppressed to such an extent that the user cannot recognize the deterioration.

In recent years, a wireless connection between components has become more desired. A wireless connection dispenses with the time and trouble of wiring, and enables the user to use each component wherever he/she desires.

In a wireless transmission path, however, transmission errors are prone to occur more, as compared with a wired transmission path. The ratio of transmission error occurrence is significantly increased if the components are spaced far apart or an obstacle is located therebetween. As a result, it is highly possible that images may be disturbed during streaming reproduction and noise may be mixed in sound.

SUMMARY OF THE INVENTION

Therefore, an object of the present invention is to provide a communications control method used in the serial transmission of a mixture of isochronous data and anisochronous data for preventing image disturbances during streaming reproduction and noise mixed in sound even though a transmission path with a high ratio of occurrence of transmission errors is used for communications.

The present invention has the following features to attain the above object.

A first aspect of the present invention is directed to a method for controlling communications among a plurality of terminals coupled to each other to form a network in which a mixture of isochronous data and anisochronous data is serially transmitted. The communications control method includes: a step of dividing time into cycles, and providing an isochronous region and an anisochronous region for each cycle; a step of, after each terminal transmits, for each cycle, the isochronous data using the isochronous region in a time division manner, determining by a destination terminal whether or not the isochronous data has been successfully received; and a step of, when there is any terminal that has not successfully received the isochronous data, instructing an originating terminal of the isochronous data to retransmit the isochronous data by using the anisochronous region.

In the above first aspect, the isochronous data that has not been successfully received is retransmitted by using the anisochronous region. Therefore, a transmission error of the isochronous data can be reduced without impairment of isochronous characteristics. As a result, image disturbances during streaming reproduction and noise mixed in sound can be prevented even if the transmission path between the terminals is the one with a high ratio of occurrence of transmission errors, such as a wireless transmission path.

According to a second aspect, in accordance with the first aspect, each terminal transmits the isochronous data with an error detection code added thereto and the destination terminal checks the error detection code after receiving the isochronous data, and the determination step is performed based on a check result.

In the above second aspect, the destination terminal of the isochronous data transmits a result of checking the error detection code added to the isochronous data. Based on the result, it can whether determined or not the isochronous data has been successfully received can.

According to a third aspect, in accordance with the first aspect, each terminal transmits the isochronous data as being divided into blocks, the determination step is performed for each block, and the instructing step is performed for each block.

In the above third aspect, the isochronous data is transmitted as being divided into blocks. Therefore, when an error occurs in only part of the received data, only the block that has the error is retransmitted. Consequently, retransmission time is reduced. Thus, the possibility that retransmission of the isochronous data using the anisochronous region may consume time for transmitting the anisochronous data can be further prevented.

If there are a plurality of terminals that have not successfully received the isochronous data, such control as indicated by the following fourth and fifth aspects is carried out.

According to the fourth aspect, in accordance with the first aspect, in the instructing step, when there are the terminals that have not successfully received the isochronous data, the originating terminals of the isochronous data are sequentially instructed to retransmit the isochronous data by using the anisochronous region in the time division manner.

According to the fifth aspect, in accordance with the first aspect, in the instructing step, when there are the terminals that have not successfully received the isochronous data, transmission times are collectively reported to the originating terminals of the isochronous data so that the originating terminals retransmit the isochronous data by using the anisochronous region in the time division manner.

In the fourth and fifth aspects, the isochronous data can be retransmitted by each terminal using the anisochronous region in a time division manner.

According to a sixth aspect, in accordance with the first aspect, each terminal modulates the isochronous data before transmission, and, in the instructing step, the originating terminal is instructed to retransmit the isochronous data after changing a modulation scheme used in modulation.

According to a seventh aspect, in accordance with the first aspect, each terminal encodes the isochronous data before transmission, and, in the instructing step, the originating terminal is instructed to retransmit the isochronous data after changing a coding rate used in encoding.

According to an eighth aspect, in accordance with the first aspect, each terminal encodes and modulates the isochronous data before transmission, and, in the instructing step, the originating terminal is instructed to retransmit the isochronous data after changing a coding rate used in encoding and a modulation scheme used in modulation.

In the above sixth to eighth aspects, the ratio of reoccurrence of transmission errors at retransmission can be further prevented. As a result, the number of times of retransmission is reduced, and thus the possibility that repetitive retransmission may consume time of transmitting the anisochronous data can be further prevented.

According to a ninth aspect, in accordance with the first aspect, each terminal carries out multicast transmission of the isochronous data to the terminals that belong to respective specific groups; in the determination step, it is determined whether or not the isochronous data has been successfully received by all terminals that belong to the group destined to receive the isochronous data; and in the instructing step, when there is one or more terminals in the group that have not successfully received the isochronous data, the originating terminal is instructed to carry out multicast retransmission of the isochronous data to all of the terminals that belong to the group.

In the above ninth aspect, even on a network where each terminal carries out multicast transmission, transmission errors of the isochronous data can be reduced without impairment of isochronous characteristics.

According to a tenth aspect, in accordance with the first aspect, each terminal carries out broadcast transmission of the isochronous data to all of other terminals; in the determination step, it is determined whether or not the isochronous data has been successfully received by all terminals destined to receive the isochronous data; and in the instructing step, when there is one or more terminals that have not successfully received the isochronous data, the originating terminal is instructed to carry out broadcast retransmission of the isochronous data to all of the terminals.

In the above tenth aspect, even on a network where each terminal carries out broadcast transmission, transmission errors of the isochronous data can be reduced without impairment of isochronous characteristics.

According to an eleventh aspect, in accordance with the first aspect, the communications control method further includes the step of dividing the isochronous region into dedicated regions, assigning the dedicated regions to the respective terminals, and reporting, to each terminal, information about the dedicated region before a start of a head of the cycle, thereby enabling transmission of the isochronous data for each cycle by each terminal using the isochronous region in the time division manner.

In the above eleventh aspect, the dedicated region information is reported to each terminal before the start of the head cycle. By referring to the dedicated region information, each terminal transmits, for each cycle, the isochronous data at the time corresponding to the dedicated region assigned to itself.

According to a twelfth aspect, in accordance with the first aspect, the communications control method further includes the step of dividing the isochronous region into dedicated regions, assigning the dedicated regions to the respective terminals, and sequentially instructing, for each cycle at respective times corresponding to the dedicated region, the terminals to transmit the isochronous data, thereby enabling transmission of the isochronous data for each cycle by each terminal using the isochronous region in the time division manner.

In the above twelfth aspect, the terminals are sequentially instructed, for each cycle, to carry out transmission at the time corresponding the dedicated region. In response to the instruction, each terminal transmits the isochronous data.

According to a thirteenth aspect, in accordance with the first aspect, the communications control method further includes the step of giving an inquiry to the destination terminal about whether or not the isochronous data has been successfully received, wherein the determination step is carried out based on a response to an inquiry.

In the above thirteenth aspect, the destination terminal is inquired about whether or not reception has succeeded.

According to a fourteenth aspect, in accordance with the first aspect, the destination terminal spontaneously gives a response about whether or not the isochronous data has been successfully received, and the determination step is carried out based on the response.

In the above fourteenth aspect, the destination terminal spontaneously reports whether or not reception has succeeded.

According to a fifteenth aspect, in accordance with the first aspect, the instructing step is carried out repetitively until the isochronous data is successfully received.

In the above fifteenth aspect, retransmission is repeated until a reception error is cleared.

According to a sixteenth aspect, in accordance with the fifteenth aspect, the communications control method further includes the step of suspending retransmission of the isochronous data even though a reception error is not cleared when a time consumed by one more retransmission presumably exceeds a predetermined maximum time allowed, for each cycle, to be consumed for retransmitting the isochronous data.

In the above sixteenth aspect, the retransmission time of the isochronous data is limited to less than a predetermined value. Thus, the possibility that retransmission may impair the isochronous characteristics of the data or consume time for transmitting the anisochronous data is prevented.

According to a seventeenth aspect, in accordance with the sixteenth aspect, the maximum time is less in value than a time length of the anisochronous region.

In the above seventeenth aspect, retransmission of the isochronous data carried out in the isochronous region of the next cycle can be prevented. Therefore, impairment of the isochronous characteristics of the data can be prevented.

According to an eighteenth aspect, in accordance with the seventeenth aspect, the maximum time is equal in value to a time length of the anisochronous region.

In the above eighteenth aspect, the entire anisochronous region can be used for the retransmission of the isochronous data. Thus, a transmission error of the isochronous data can be most effectively reduced.

According to a nineteenth aspect, in accordance with the seventeenth aspect, the communications control method further includes the step of retransmitting, in the anisochronous region of a next cycle, the isochronous data whose retransmission is suspended.

In the above nineteenth aspect, suspended retransmission of the isochronous data is restarted after the procedure enters into the anisochronous region of the next cycle.

According to a twentieth aspect, in accordance with the fifteenth aspect, the communications control method further includes the step of suspending retransmission of the isochronous data even though a reception error is not cleared when the number of times of retransmission exceeds a predetermined maximum number of times of retransmission of the isochronous data.

In the above twentieth aspect, an infinite repetition of retransmission of the same isochronous data can be prevented.

A twenty-first aspect of the present invention is directed to a communications control apparatus for controlling communications among a plurality of terminals coupled to each other to form a network in which a mixture of isochronous data and anisochronous data is serially transmitted. The communications control apparatus includes: a part for dividing time into cycles, and providing an isochronous region and an anisochronous region for each cycle; a part for, after each terminal transmits, for each cycle, the isochronous data using the isochronous region in a time division manner, determining by a destination terminal whether or not the isochronous data has been successfully received; and a part for, when there is any terminal that has not successfully received the isochronous data, instructing an originating terminal of the isochronous data to retransmit the isochronous data by using the anisochronous region.

A twenty-second aspect of the present invention is directed to a computer-processable program having a method such as that according to the above first aspect written thereon.

A twenty-third aspect of the present invention is directed to a recording medium having a program such as that according to the above twenty-second aspect stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing one example of dedicated region information reported to each terminal in step S5 of FIG. 7;

FIG. 12 is a diagram showing an example of the structure of a response packet transmitted in step S63 of FIG. 11;

FIG. 16 is a diagram showing the contents of a global polling packet 90 being multicast by the control station;

FIG. 17 is a diagram showing the contents of a global retransmission request packet 95 being multicast by the control station;

FIG. 18 is a schematic diagram showing a communications control method according to a fourth embodiment of the present invention;

DETAILED DESCRIPTION OF THE PREFERRED EMBODIMENTS

First Embodiment

Figure 1:
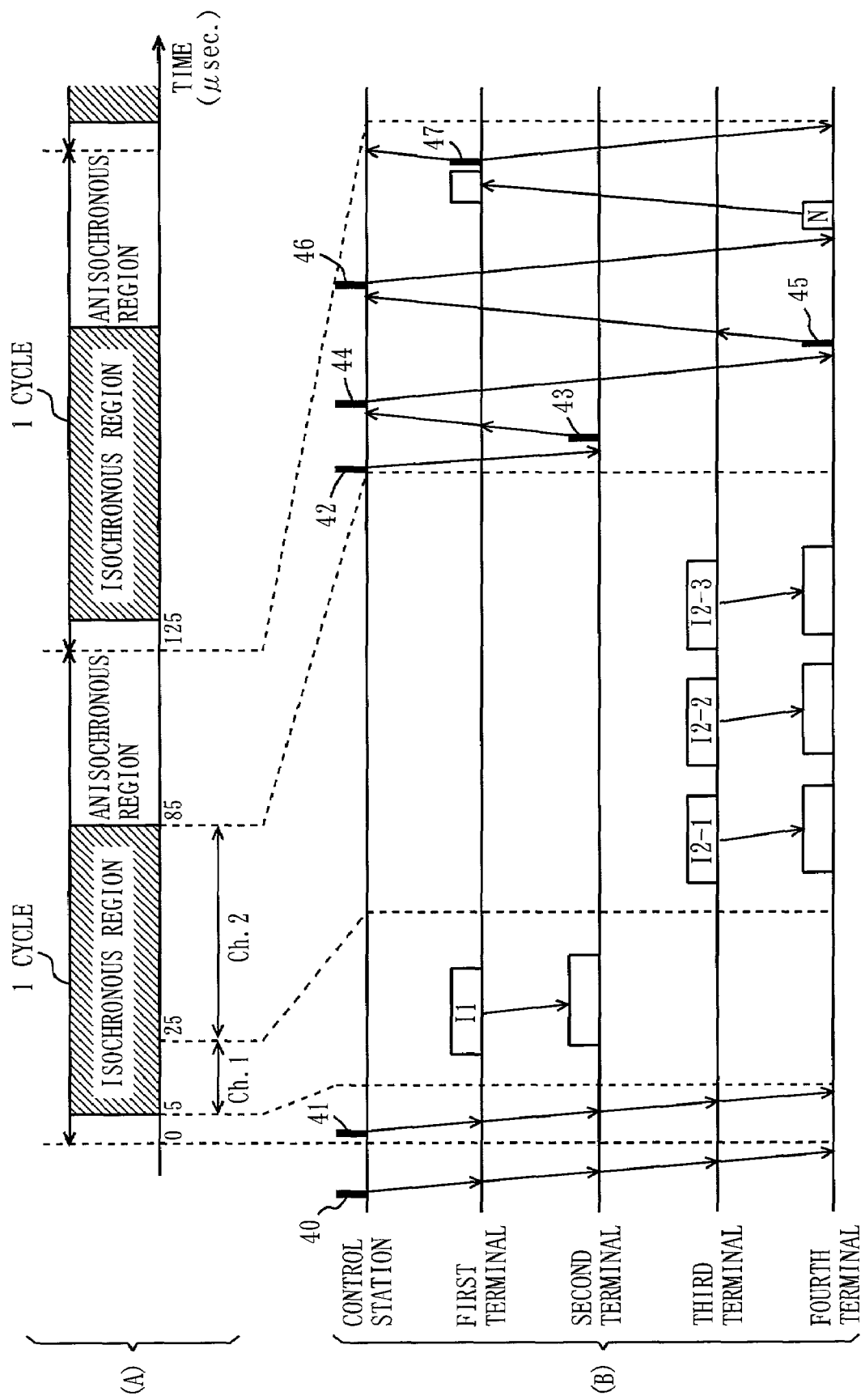
FIG. 1 is a schematic diagram for demonstrating a communications control method according to a first embodiment of the present invention, where (A) of FIG. 1 illustrates an example of the structure of a communications control cycle and (B) of FIG. 1 illustrates an example of communications control carried out in a wireless local-area network 9 of FIG. 2.
Figure 2:
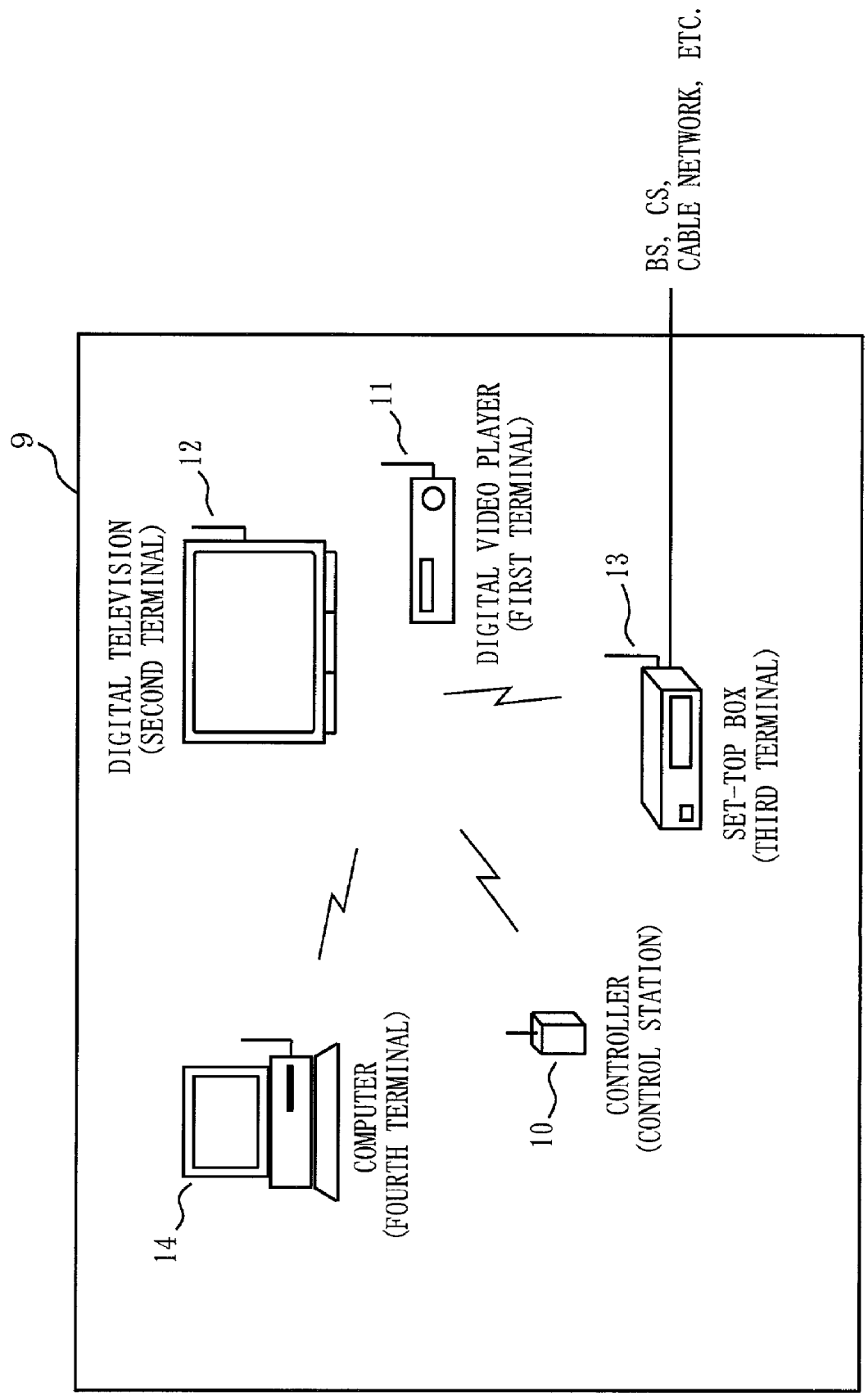
FIG. 2 is a diagram showing an example of the structure of the network 9 to which the method of FIG. 1 is applied.
Figure 23:
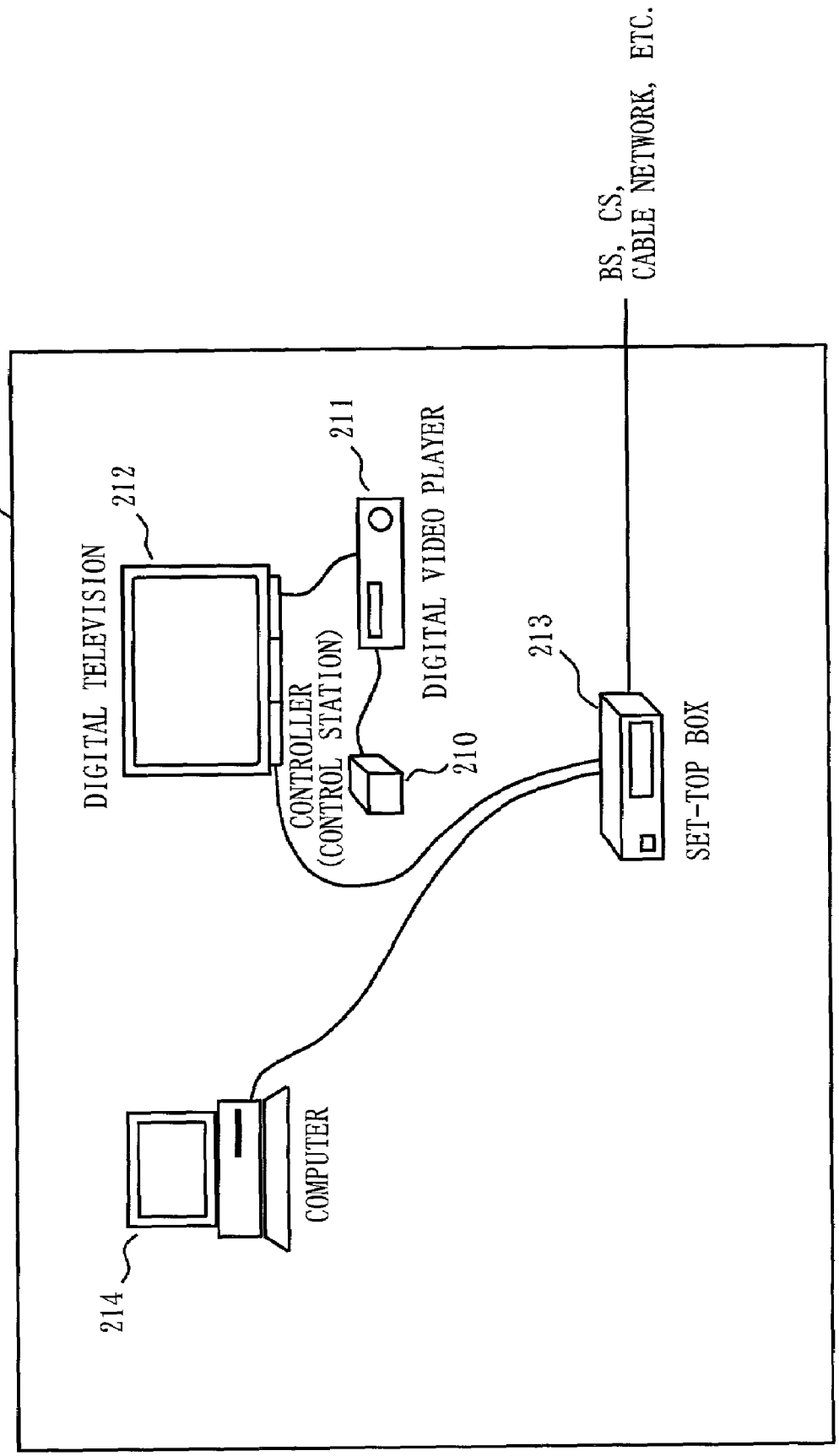
FIG. 23 is a diagram showing an example of the structure of a conventional local-area network that complies with the IEEE 1394 standard.
Figure 24:
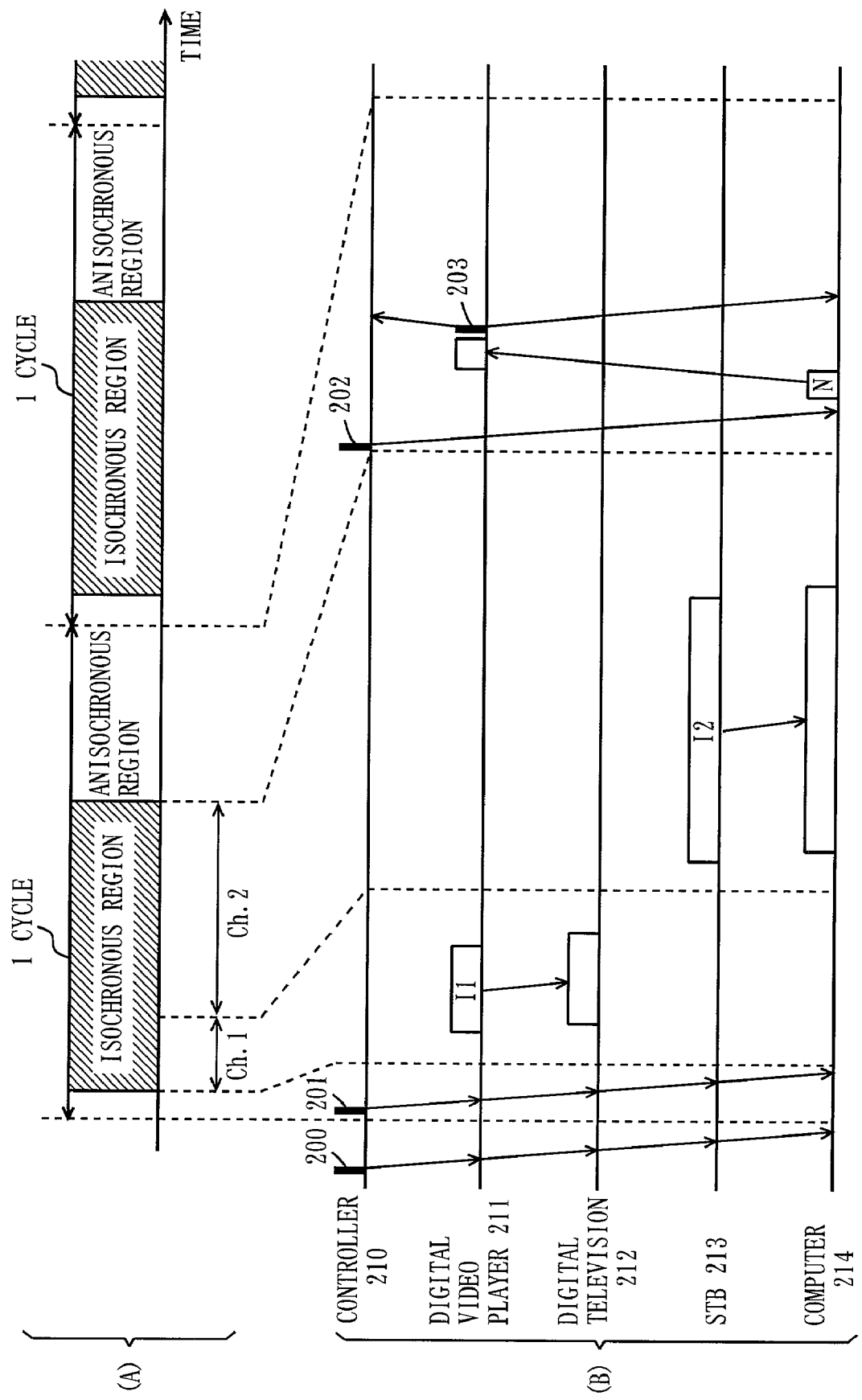
FIG. 24 is a schematic diagram for demonstrating a conventional communications control method according to the IEEE 1394 standard, where (A) of FIG. 24 illustrates an example of the structure of a communications control cycle according to IEEE 1394 and (B) of FIG. 24 illustrates an example of communications control carried out on a network 209 of FIG. 23.

FIG. 1 is a schematic diagram for demonstrating a communications control method according to a first embodiment of the present invention. FIG. 2 is a diagram illustrating an example of the structure of a wireless local area network 9 to which the method of FIG. 1 is applied. In FIG. 2, the wireless local area network 9 includes a controller 10, a digital video player 11, a digital television 12, a set-top box (hereinafter, STB) 13, and a computer 14. These components 10 to 14 are wirelessly coupled to each other. This network 9 is almost the same as the network 209 of FIG. 23 (refer to Background Art section), except that the ratio of occurrence of transmission errors is high because of the wireless connection among the components 10 to 14. In the network 9, the controller 10 controls wireless communications among the components 11 to 14.

Figure 3:
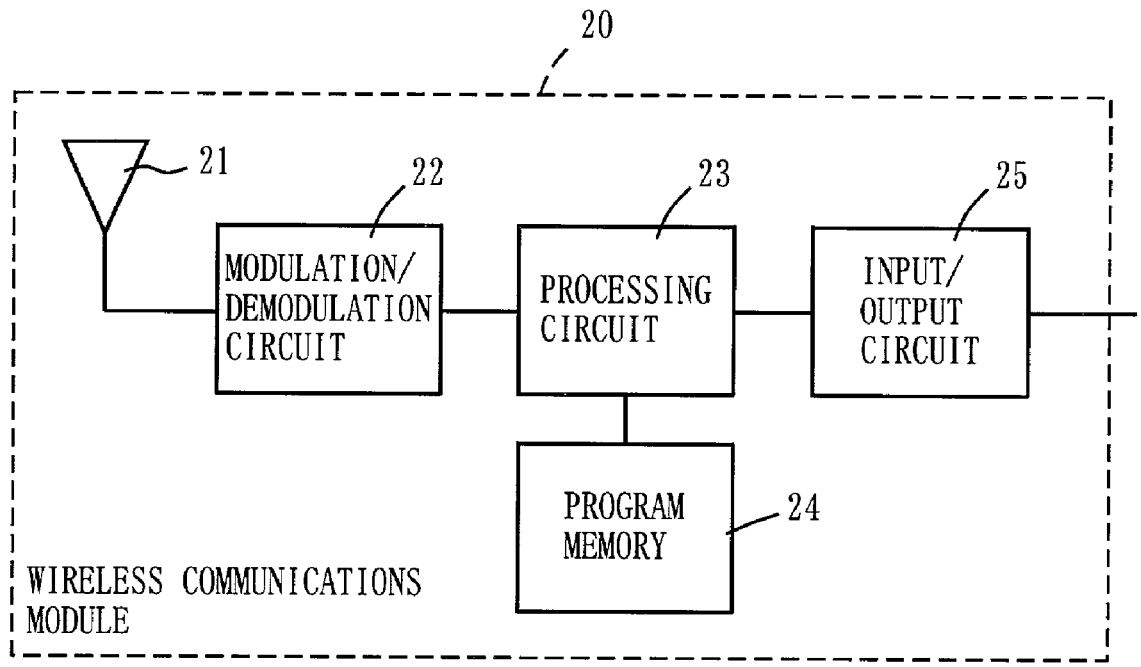
FIG. 3 is a diagram showing an example of the structure of a wireless communications module 20 provided in each component (10 to 14) of FIG. 2.

Each of the components 10 to 14 forming the wireless local area network 9 is provided with a wireless communications module. An example of the structure of the wireless communications module is shown in FIG. 3. In FIG. 3, a wireless communications module 20 includes an antenna 21, a modulation/demodulation circuit 22, a processing circuit 23, a program memory 24, and an input/output circuit 25.

The antenna 21 converts a signal into an electric wave for emission and also acquires an electric wave for conversion into a signal. The modulation/demodulation circuit 22 modulates/demodulates the signal. The input/output circuit 25 is connected to another input/output circuit (not shown) of any of the components 10 to 14 equipped with this module for transmitting and receiving signals with the component.

The program memory 24 stores various programs. The processing circuit 23 includes a microcomputer that processes signals by following the programs stored in the program memory 24. The contents of the program memory 24 are shown in FIG. 4.

Figure 4:
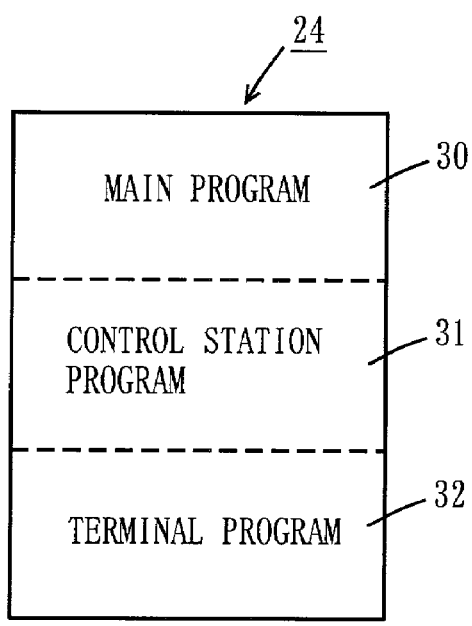
FIG. 4 is a diagram showing the contents of a program memory 24 of FIG. 3.

In FIG. 4, the program memory 24 stores a main program 30, a control station program 31, and a terminal program 32. The main program 30 describes the basic procedure for the module carrying out wireless communications. The control station program 31 describes the procedure for the module as a control station controlling the communications among the components. The terminal program 32 describes the procedure for the module as a terminal carrying out communications. These procedures described in the respective programs are computer-processable.

The wireless communications module 20 equipped in the controller 10 is initially set so that the control station program 31 is first activated. The wireless communications module 20 equipped in any of the other components 11 to 14 is initially set so that the terminal program 32 is first activated. Note that, by changing the initial setting, it is possible to make the component such as the computer 14 or the STB 13 operate as a controller.

In the above structured network 9, assume herein that isochronous data "I1" is going to be transmitted from the digital video player 11 (first terminal) to the digital television 12 (second terminal); isochronous data "I2" is going to be transmitted from the STB 13 (third terminal) to the computer 14 (fourth terminal); and anisochronous data "N" is going to be transmitted from the computer 14 (fourth terminal) to the digital video player 11 (first terminal). Here, the controller (control station) 10 controls communications among the components (first to fourth terminals) so that a mixture of the isochronous data recurring at periodic time intervals and anisochronous data can be serially transmitted.

Hereinafter, the controller 10 is referred to as "control station", and the components 11 to 14 are referred to as a "first to fourth terminals", respectively. In this communications control, as shown in (A) of FIG. 1, time is divided into predetermined cycles, and each cycle is provided with an isochronous region and anisochronous regions. Then, the isochronous region is further divided into plural (two, in this example) dedicated regions. These regions are respectively assigned, as Ch. 1 and Ch. 2, to the components having the isochronous data to be transmitted (first and third terminals).

Here, the time length of the isochronous region is determined based on the amount of the isochronous data to be transmitted per unit time, and is limited, however, to a predetermined value so that the transmission path is not totally occupied by the isochronous data. By way of example only, if one cycle is 125 μsec, the time length of the isochronous region is limited to not more than 100 μsec, for example.

Furthermore, the isochronous region is provided so as to be located a predetermined time apart from the head of the cycle. Therefore, two regions preceding and following the isochronous region in the cycle are the anisochronous regions.

Furthermore, the control station knows the amount of isochronous data to be transmitted from each terminal per unit time. Therefore, the control terminal divides the isochronous region into dedicated regions based on the amount of transmission from each terminal, and assigns these dedicated regions to the respective terminals.

An example of the structure of the communication control cycle is shown in (A) of FIG. 1. An example of communications control carried out on (in) the network 9 of FIG. 2 is shown in (B) of FIG. 1.

In the example of (A) of FIG. 1, each cycle has the isochronous region provided from 5 μsec away from the head of the cycle as the origin (0 μsec) to 85 μsec. Therefore, two regions from 0 to 5 μsec and from 85 to 125 μsec are the anisochronous regions. The isochronous region is divided into two dedicated regions, one (Ch. 1) from 5 to 25 μsec assigned to the first terminal and the other (Ch. 2) from 25 to 85 μsec to the third terminal.

After such assignment of the dedicated regions, the control station reports, to each station before the start of data transmission, information 40 about the dedicated regions assigned the respective terminals. When data transmission is started and the procedure enters into the first cycle, the control station transmits a packet 41 indicating the start of the cycle to each terminal. The transmission of the cycle start packet 41 is carried out in the anisochronous region from 0 to 5 μsec.

In response, the terminals (first and third terminals) having the isochronous data to be transmitted (I1 and I2) each transmit the isochronous data (I1 and I2) using the respective dedicated regions (channel 1 and channel 2). At this time, the third terminal divides the isochronous data I2 into three blocks (I2-1, I2-2, and I2-3) for transmission. The reason for such division will be described later.

After the procedure exits the isochronous region, the control station first makes an inquiry about whether or not the transmitted isochronous data (I1 and I2) has been received without error. Specifically, the control station inquires the second and fourth terminals that are the destinations of I1 and I2 about whether or not the isochronous data I1 and I2 have been successfully received. In other words, the control station first transmits an inquiry packet 42 to the second terminal, and then waits for a response packet 43 to be returned from the second terminal. Then, when the response packet 43 is returned from the second terminal, the control station then transmits an inquiry packet 44 to the fourth terminal, and waits for a response packet 45 to be returned from the fourth terminal. Then, when the response packet 45 is returned from the fourth terminal, the control station analyzes the two response packets 43 and 45 from the second and fourth terminals to determine whether or not the isochronous data I1 and I2 have to be retransmitted. In the present example, both of the response packets indicate that the data has been successfully received. Therefore, the control station determines that no retransmission is required, and then the procedure goes to communications control for the anisochronous data.

That is, the control station gives a transmission instruction 46 to the terminal having the anisochronous data to be transmitted, that is, the fourth terminal. Upon receiving the transmission instruction 46 from the control station, the fourth terminal transmits the anisochronous data (N). The terminal that is the destination of the anisochronous data (first terminal) returns to the data originating terminal (fourth terminal) and the control station a response packet 47 indicating whether or not the data has been successfully received. In this example, the received response packet 47 indicates that the data has been successfully received. Therefore, the control station determines that no retransmission is required. Then, if any terminal having anisochronous data to be transmitted exists, the control station allows the terminal to carry out transmission, and if not, enters in a wait state.

Then, when the procedure exits the first cycle and then enters into the next cycle, the control station transmits a packet indicating the start of the next cycle to each terminal, and then repeats the operation as describe above.

In the example of (B) of FIG. 1, all of the isochronous data (blocks) transmitted have been successfully received. An example case where a reception error occurs is shown in FIG. 5.

Figure 5:
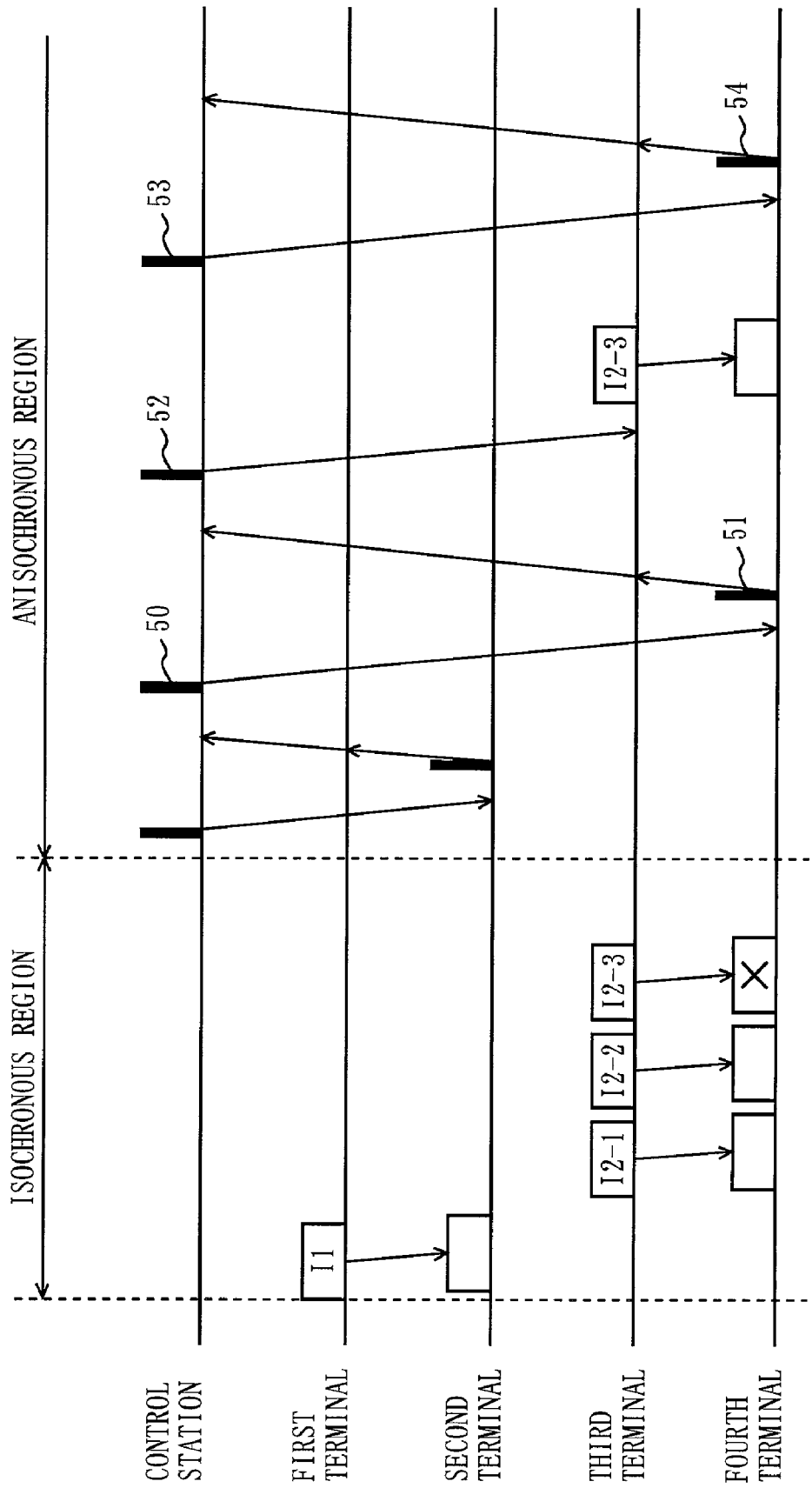
FIG. 5 is a schematic diagram, in relation to (B) of FIG. 1, for demonstrating retransmission control carried out when isochronous data (block) has not been successfully received.

FIG. 5 is a schematic diagram for demonstrating retransmission control that is carried out when the isochronous data (block) has not been successfully received. FIG. 5 shows retransmission control that is carried out when the isochronous block I2-3 transmitted from the third terminal has not been successfully received by the fourth terminal. In this case, upon receiving an inquiry packet 50 from the control station, the fourth terminal returns a response packet 51 indicating that the isochronous block I2-3 has not been successfully received. Based on the received response packet 51, the control station determines that retransmission is required, and transmits a retransmission instruction 52 for retransmitting the isochronous block I2-3 to the third terminal. In response, the third terminal retransmits the isochronous block I2-3 to the fourth terminal.

Then, the control station sends a packet 53 for inquiring the fourth terminal, which is the retransmission destination of the isochronous block I2-3, about whether or not the retransmitted data has been successfully received. In this example, the fourth terminal has received the retransmitted isochronous block I2-3 without error, and therefore returns a response packet 54 indicating that as such. Based on the received response packet 54, the control station determines that retransmission is not required. Then, the procedure goes to the communications control of anisochronous data.

As such, according to the present communications control method, when the isochronous data has not been successfully received, the isochronous data is retransmitted by using the anisochronous data region. Therefore, a transmission error of the isochronous data can be reduced without impairment of isochronous characteristics of the data.

Also, the terminal divides the isochronous data into a plurality of blocks for transmission. Therefore, if an error occurs only in part of the data, only the block where the error occurred is transmitted, thereby reducing the time which is required for retransmission. Thus, it is possible to further reduce the possibility that retransmission of the isochronous data using the anisochronous region may consume time for transmission of the anisochronous data.

In the example of FIG. 5, the isochronous data I2 is divided into three blocks (I2-1, I2-2, I2-3) for transmission. In general, the more the number of divisions, the lesser the possibility of consuming time for transmission of the anisochronous data. However, if the isochronous data is divided into a plurality of blocks, error detection has to be made for each block. Therefore, there is a greater number of divisions, the more the amount of processing for error detection. For this reason, it is preferable that the number of divisions is appropriately selected in consideration of the above mentioned possibility and the amount of processing for error detection.

Retransmission of the anisochronous data that has not been successfully received is carried out in a similar manner to that of the conventional method. For example, when the response packet returned from the first terminal indicates that reception has failed, the control station transmits an instruction for retransmission to the fourth terminal, which is the originating terminal of the anisochronous data (N). In response, the fourth terminal retransmits the anisochronous data. Then, the first terminal, which is the destination terminal of retransmission, returns a response packet to the fourth terminal and the control station. When the response packet indicates that reception has failed, the control station again instructs the fourth terminal to retransmit the anisochronous data.

As such, the communications control method divides time into cycles, and each cycle has an isochronous region and anisochronous regions. Then, communications control of the isochronous data is carried out in the isochronous region. In the anisochronous region, retransmission control of the isochronous data that has not been successfully received is first carried out, and then communications control of the anisochronous data is executed.

Thus, a mixture of isochronous data and anisochronous data can be serially transmitted, and a transmission error that may occur in the isochronous data can be reduced without impairment of the isochronous characteristics. Consequently, even if the rate of occurrence of transmission errors is high on the transmission path between the terminals, such as a wireless transmission path, disturbances in video during streaming reproduction and interruption in audio can be prevented.

Note that, in the example of FIG. 5, the retransmitted isochronous data (block I2-3) has been successfully received. However, if the retransmitted isochronous data has not again been successfully received, retransmission is repeated until a reception error is cleared (i.e., until the retransmitted isochoronous data is successfully received). Alternatively, a maximum value of time used for the retransmission of the isochronous data per cycle may be predetermined. In this case, if one more retransmission operation causes the total retransmission time to exceed the maximum value, retransmission is suspended even though a reception error is not cleared. This case is illustrated in FIG. 6.

In general, the maximum value of the retransmission time of the isochronous data per cycle is determined so as not to exceed the time length of the anisochronous region, thereby keeping the isochronous characteristics of the isochronous data.

Figure 6:
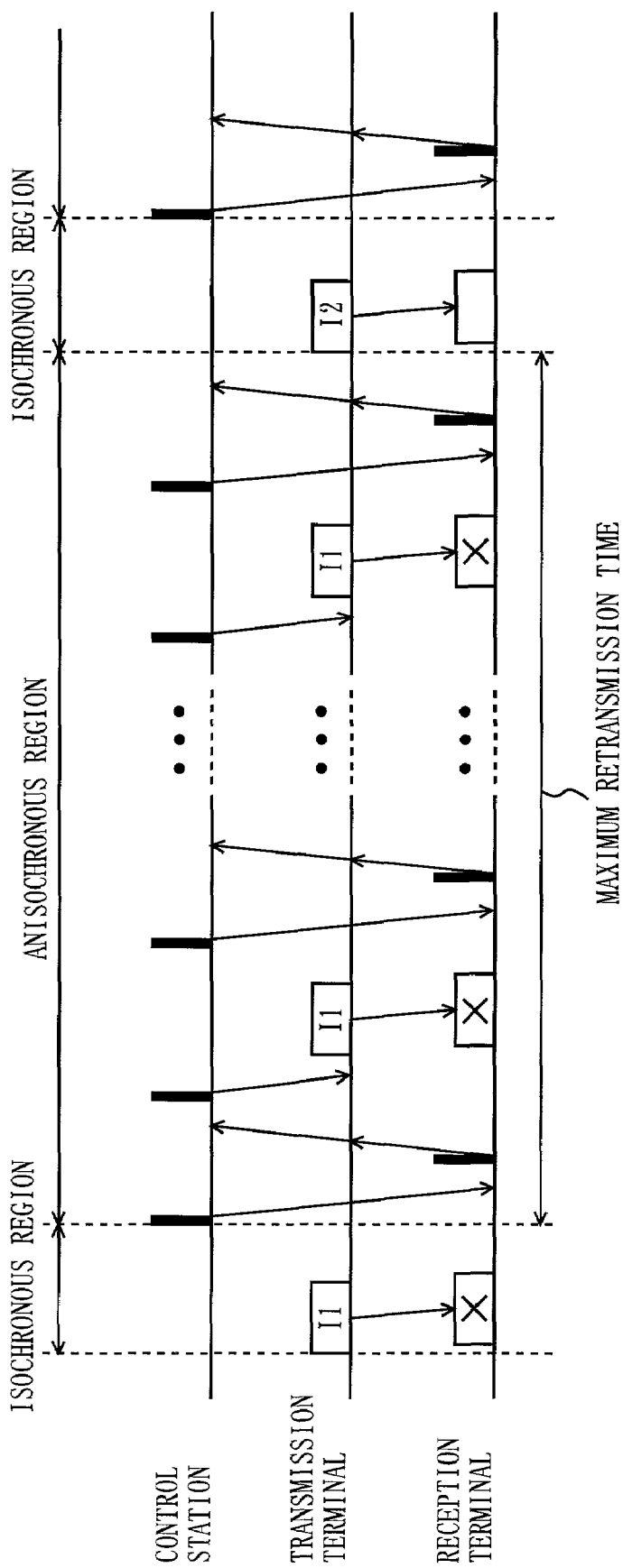
FIG. 6 is a diagram, in relation to (B) of FIG. 1, showing the state where retransmission of isochronous data is suspended even if a reception error is not solved.

In FIG. 6, the above maximum value is set to a value which is equal to the time length of the anisochronous region (45 μsec, for example), thereby putting reduction in a transmission error of the isochronous data as the highest priority. In the setting as shown in FIG. 6, however, anisochronous data may not possibly be transmitted at all. Therefore, in general, the maximum value is set to a value which is smaller than the time length of the anisochronous region (30 μsec, for example).

Figure 7:
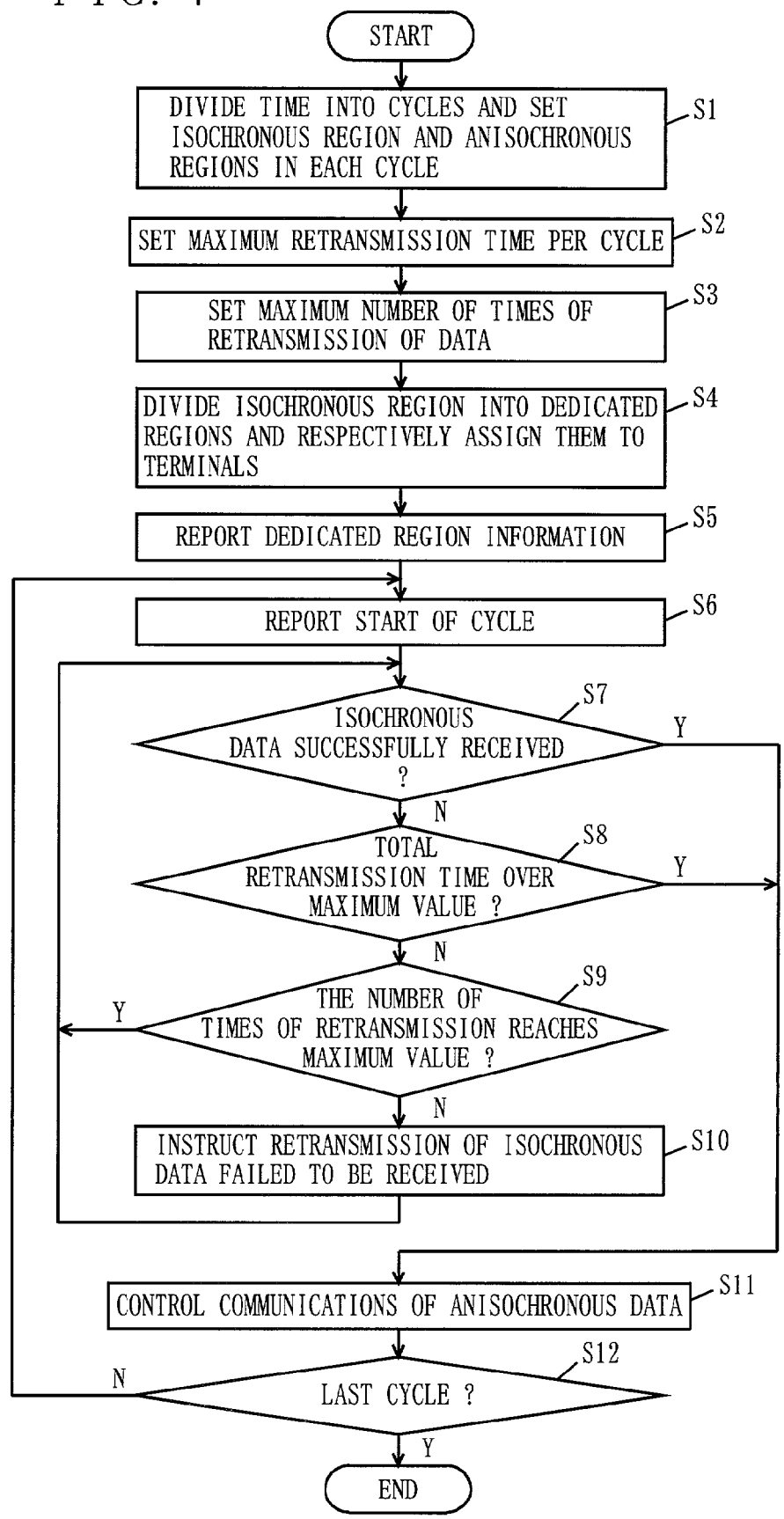
FIG. 7 is a flowchart showing the operation of a controller 10 (control station) of FIG. 2.

Described next is the operation of the control station with reference to a flowchart. FIG. 7 is a flowchart showing the operation of the control station 10 of FIG. 2. In FIG. 7, the control station first divides time into cycles, and sets, in each cycle, an isochronous region and anisochronous regions (step S1). Then, the maximum time used for retransmission of the isochronous data in each cycle is set (step S2). This maximum value is set to a value that does not exceed the time length of the anisochronous region. Furthermore, the maximum number of times of retransmission, indicating how may times retransmission of the same isochronous data can be allowed, is set (step S3). The maximum number of times of retransmission will be described in detail later.

The control station then divides the isochronous region set in step S1 into a plurality of dedicated regions, and assigns the dedicated regions to respective terminals (step S4). The control station then reports information about the assigned dedicated region to each terminal before the start of transmission (step S5). A timing of each terminal transmitting the isochronous data is described in the dedicated region information. An example of the dedicated region information is illustrated in FIG. 8

As shown in FIG. 8, transmission times of respective isochronous data blocks are described in the dedicated region information packet.

Following step S5, the control station reports the start of the cycle to each terminal (step S6). In response, each terminal transmits its own isochronous data using the assigned dedicated region.

Then, the control station determines whether or not the isochronous data transmitted from each terminal has been successfully received by the destination terminal (step S7). If Yes, the procedure goes to step S11.

If No in step S7, the control station further determines whether one or more retransmission operation(s) in the cycle causes the total retransmission time to exceed the maximum value set in step S2 (step S8). If Yes, the control station suspends retransmission, and goes to step S11.

If No in step S8, the control station determines whether or not the number of times of retransmission of the isochronous data that has not been successfully received reaches the maximum number of times of retransmission set in step S3 (step S9). If Yes, the procedure returns to step S7, and repeats the above processing.

If No in step S9, the control station instructs the data originating terminal to retransmit the isochronous data that has not been successfully received (step S10). In response, the data originating terminal retransmits the isochronous data by using the anisochronous region. The procedure then returns to step S7, and repeats the above processing.

In step S11, the control station carries out transmission control on the anisochronous data until the procedure reaches at the end of the anisochronous region.

In the next step S12, it is determined whether or not the current cycle is the last one. If Yes, the operation of the control station ends.

If No in step S12, the procedure returns to step S6, where the control station reports the start of the next cycle to each terminal, and then repeats the above processing.

Figure 9:
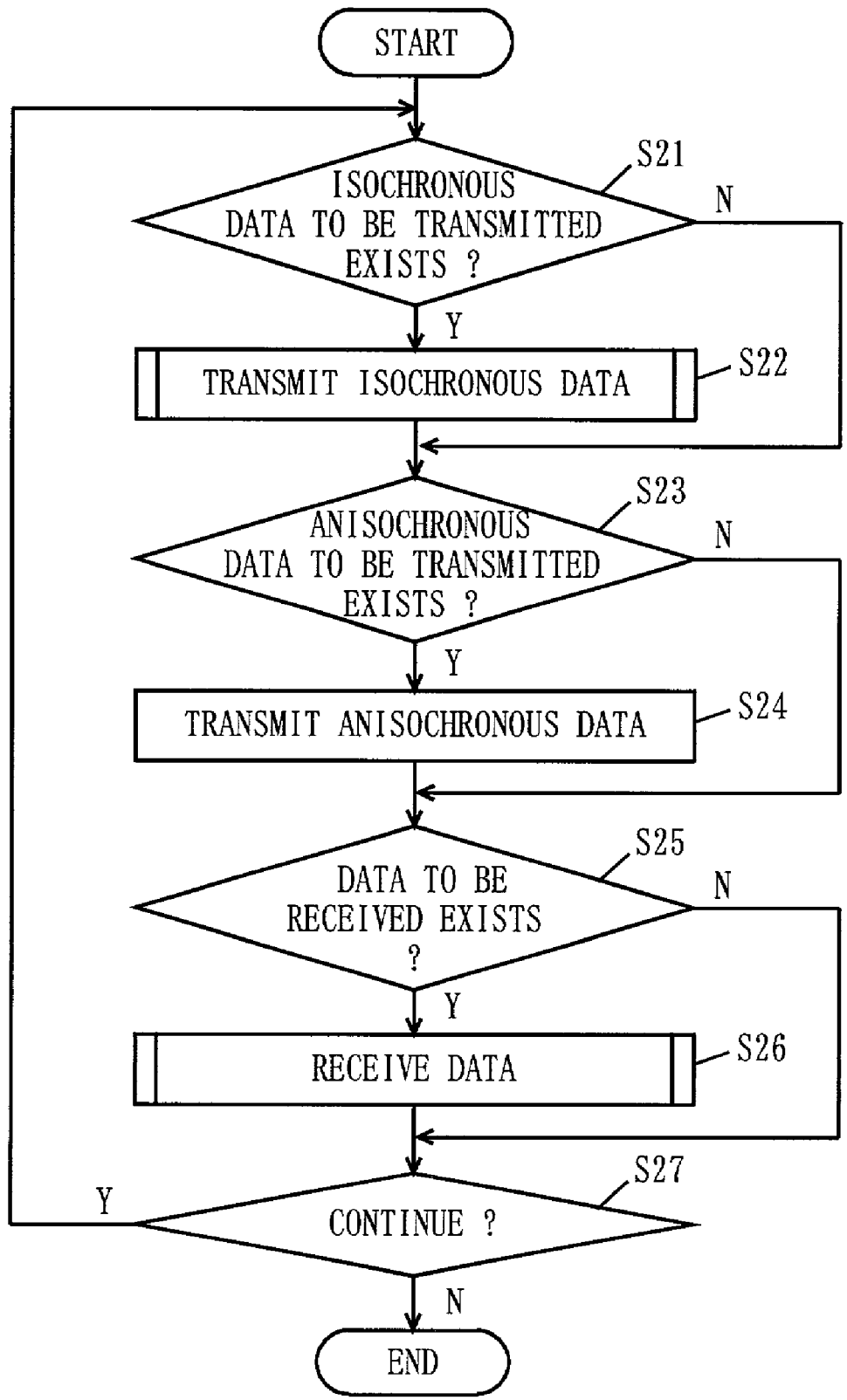
FIG. 9 is a flowchart showing the operation of each terminal (11 to 14) of FIG. 2.

Described next is the operation of the terminal. FIG. 9 is a flowchart showing the operation of each of the terminals 11 to 14 shown in FIG. 2. In FIG. 9, the terminal first determines whether or not it has isochronous data to be transmitted (step S21). If No, the procedure goes to step S23.

If Yes in step S21, the terminal transmits the isochronous data (step S22). Then, the terminal determines whether or not it has anisochronous data to be transmitted (step S23). If No, the procedure goes to step S25.

If Yes in step S23, the terminal transmits the anisochronous data (step S24), and then the procedure goes to step S25. Note that the transmitted anisochronous data has an error detection code added thereto.

In step S25, the terminal determines whether or not it has to receive any data. If Yes, the terminal executes a data reception operation (step S26), and then the procedure goes to step S27. If No in step S25, the procedure skips step S26 to go to step S27.

In step S27, it is determined whether or not to continue the operation. If Yes, the procedure ends. If No, the procedure returns to step S21, and repeats the above processing.

Figure 10:
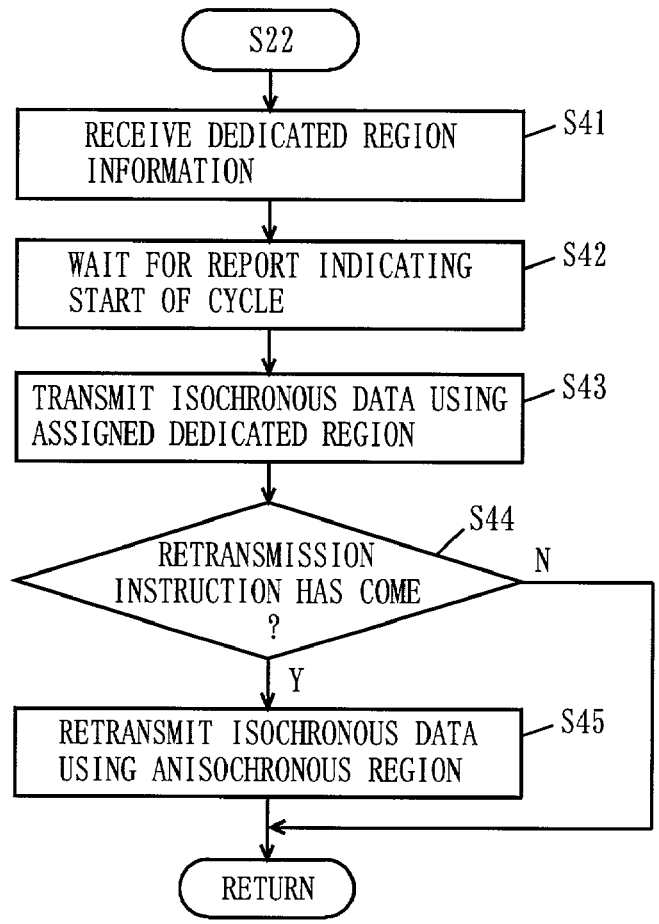
FIG. 10 is a flowchart showing detailed transmission processing of isochronous data shown in step S22 of FIG. 9.

FIG. 10 is a flowchart showing the detailed processing of transmitting the isochronous data shown in step S22 of FIG. 9. In FIG. 10, the terminal first receives a report about the dedicated region information from the control station (step S41). Then, the terminal waits for a report indicating the start of the cycle (step S42).

After being notified of the start of the cycle, the terminal transmits the isochronous data by using the assigned dedicated region (step S43). That is, the terminal transmits the isochronous data at the time described in the dedicated region information received in step S41. Note that the transmitted isochronous data has an error detection code added thereto.

Then, the terminal determines whether or not it has been instructed by the control station to retransmit the isochronous data (step S44). If No, the procedure returns to the flow of FIG. 9, and goes to step S23.

If Yes in step S44, the terminal retransmits the isochronous data using the anisochronous region (step S45). Note that the retransmitted isochronous data has an error detection code added thereto. The procedure then returns to the flow of FIG. 9, and goes to step S23. These are the details of step S22.

Figure 11:
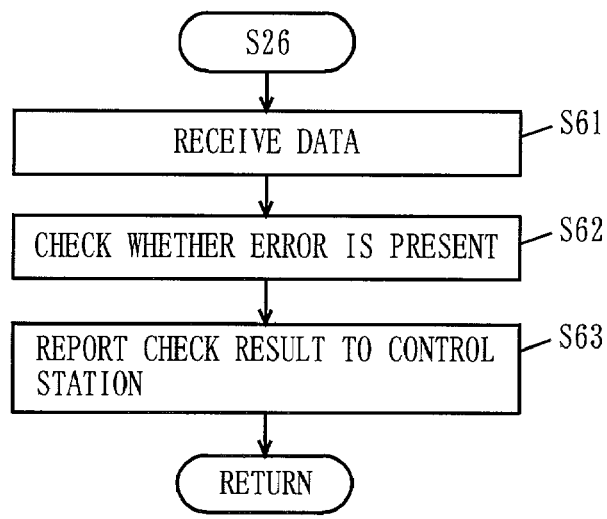
FIG. 11 is a flowchart showing detailed data reception processing shown in step S26 of FIG. 9.

FIG. 11 is a flowchart showing the detailed processing of data reception shown in step S26 of FIG. 9. In FIG. 11, the terminal first receives data that is destined thereto (step S61). The terminal then checks whether or not the received data has any error (step S62). This check can be done based on the error detection code added to the received data.

The terminal then transmits a response packet including the check result obtained in step S62 to the control station (step S63). The procedure then returns to the flow of FIG. 9, and goes to step S27. An example structure of the response packet is shown in FIG. 12.

As shown in FIG. 12, a state of reception of the isochronous data (the presence or absence of an error) for each block is described in the response packet.

Figure 13:
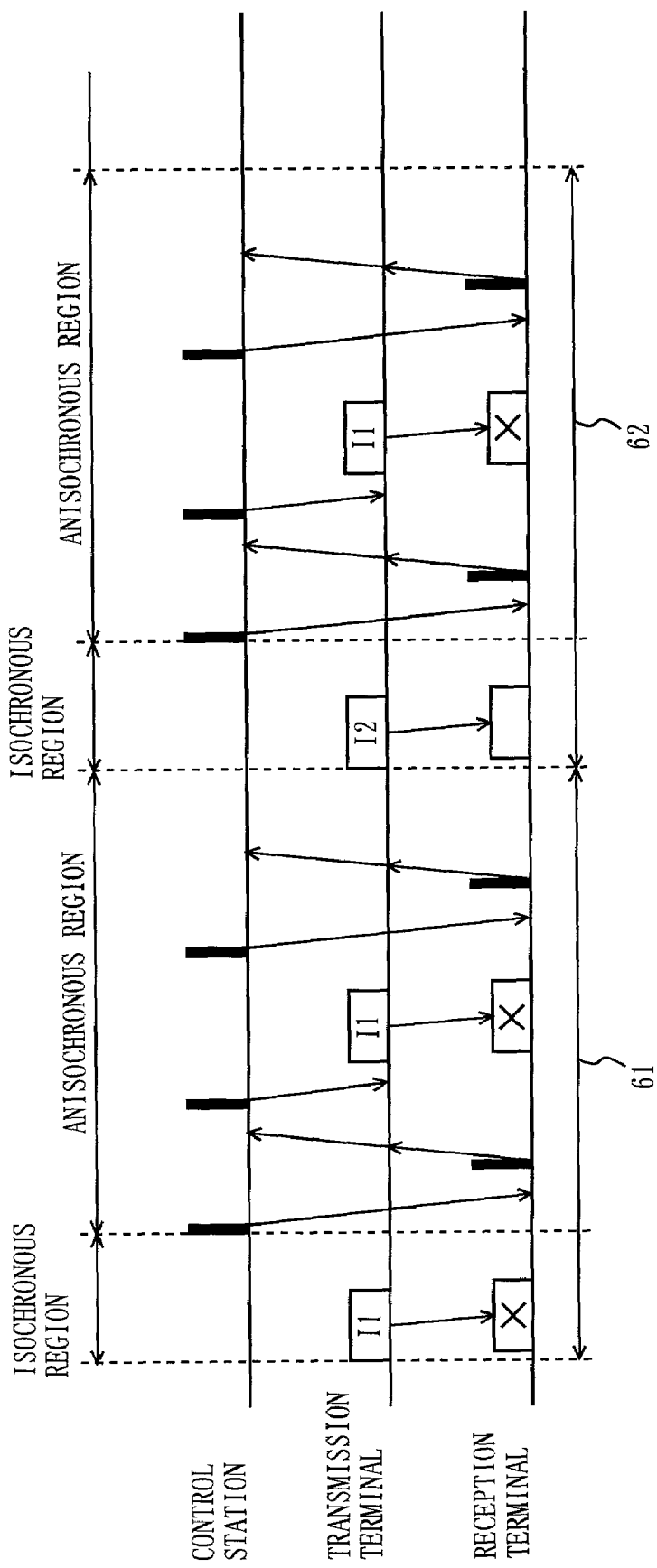
FIG. 13 is a diagram showing the state where isochronous data whose retransmission is suspended based on the determination result in step S8 of FIG. 7 is retransmitted at a next anisochronous region of the next cycle.

Note that, the isochronous data whose retransmission is suspended based on the determination in step S8 that a further retransmission operation will exceed the maximum value is retransmitted in the anisochronous region of the next cycle. This is shown in FIG. 13. In FIG. 13, retransmission of the isochronous data I1 is once suspended at the end of the cycle 61, and is then restarted after the procedure enters into the anisochronous region of the next cycle 62.

However, repetitive retransmission of the same isochronous data may consume time for retransmitting other isochronous data. To get around this problem, the number of times of retransmission of the same data is limited to not more than a predetermined number (two, for example). This is the maximum number of times of retransmission set in step S3. In the example of FIG. 13, even though the second retransmission using the anisochronous region of the next cycle 62 has not cleared the transmission error, the third retransmission is not performed because the number of times of retransmission of the same data is limited to not more than two.

Here, to reduce the number of times of retransmission, when instructing the originating terminal to retransmit the isochronous data that has not been successfully received, the control station may also instruct the originating terminal to change the modulation scheme and/or the coding rate.

Specifically, before transmitting the isochronous data, each terminal encodes the data at a predetermined coding rate, and then modulates the encoded data in a predetermined scheme. If the modulation scheme used for transmission is changed at retransmission, the possibility of the occurrence of transmission errors can be reduced, as compared with the case where the same modulation scheme is used for retransmission. If the coding rate used for transmission is also changed at retransmission, the possibility of the occurrence of transmission errors can be further reduced. Consequently, the number of times of retransmission can be reduced, and the possibility that repetitive retransmission may consume time for transmitting anisochronous data can be further reduced.

In the first embodiment, each terminal transmits the isochronous data to a single terminal. Alternatively, each terminal may carry out multicast transmission, where each terminal transmits the isochronous data to a plurality of terminals of respective specific groups. Still alternatively, each terminal may carry out broadcast transmission, where each terminal transmits the isochronous data to all of the other terminals. Described in a second embodiment below is communications control when each terminal carries out multicast or broadcast transmission of isochronous data.

Second Embodiment

Figure 14:
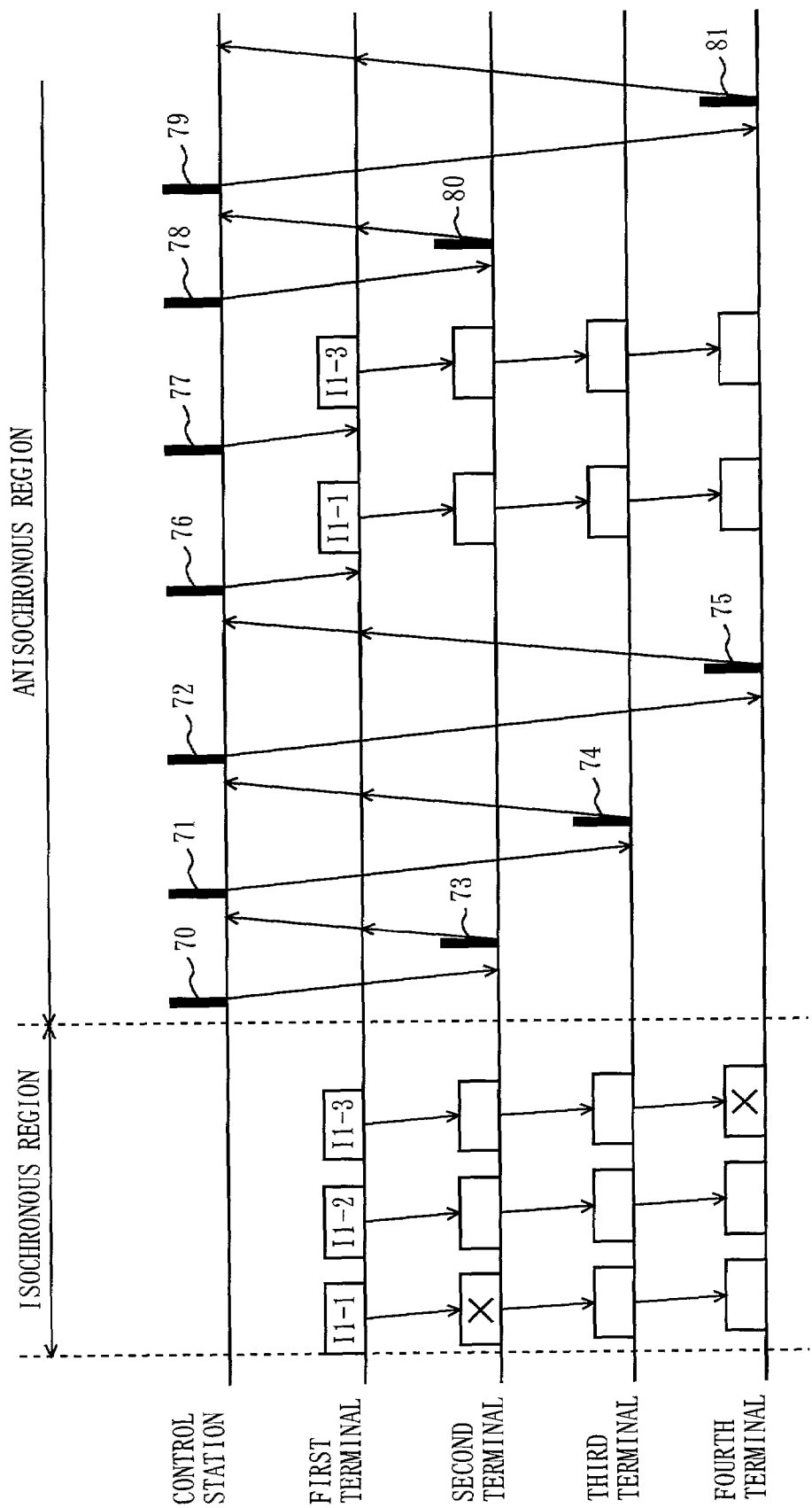
FIG. 14 is a schematic diagram for demonstrating a communications control method according to a second embodiment of the present invention.

FIG. 14 is a schematic diagram for demonstrating a communications control method according to the second embodiment of the present invention. One example structure of a wireless local area network to which the method of FIG. 14 is applied is similar to that shown in FIG. 2. The structure of the wireless communications module 20 equipped in the control station and each terminal shown in FIG. 2 is similar to that shown in FIG. 3. The contents of the program memory 24 of FIG. 3 are similar to those shown in FIG. 4, except that the control station program 31 and the terminal program 32 are partly different from those according to the first embodiment.

In the example of FIG. 14, in a single isochronous region, the first terminal carries out broadcast transmission of three isochronous blocks (I1-1, I1-2, and I1-3) to the second to fourth terminals. Here, if many terminals other than those shown in the drawing exist and the second to fourth terminals belong to a single group, the first terminal is regarded as carrying out multicast transmission to the terminals that belong to the group.

As shown in FIG. 14, the second terminal has successfully received the blocks I1-2 and I1-3, but has not successfully received the block I1-1. The third terminal has successfully received the blocks I1-1, I1-2, and I1-3. The fourth terminal has successfully received the blocks I1-1 and I1-2, but has not successfully received the block I1-3.

In the anisochronous region, the control station sequentially transmits inquiry packets 70 to 72 for inquiring the destination stations (the second to fourth terminals) about whether or not they have successfully received the isochronous data. Upon sequentially receiving response packets 73 to 75 from the second to fourth terminals, the control station sequentially transmits, to the data originating station (the first terminal), packets 76 and 77 for instructing retransmission of the isochronous blocks that have not been successfully received (I1-1 and I1-3).

In response, the first terminal carries out broadcast retransmission of the blocks I1-1 and I1-3 to the second to fourth terminals. Then, the control station sequentially transmits packets 78 and 79 for inquiring the second and fourth terminals, which have not successfully received the blocks I1-1 and I1-3, respectively, about whether or not they have received the respective retransmitted blocks. Then, after the control station receives, from the second and fourth terminals, response packets 80 and 81 each indicating that the retransmitted block has been successfully received, the retransmission processing ends.

The operation of the control station is similar to that shown in FIG. 7. However, in the case of multicast transmission where each terminal transmits the isochronous data to a plurality of terminals that belong to respective specific groups, the control station determines in step S7 whether or not the isochronous data has been successfully received by all terminals that belong to one group. Then, if there is any terminal in that group which has not successfully received the isochronous data, multicast retransmission of the isochronous data to all terminals in the group is carried out.

On the other hand, if each terminal carries out broadcast transmission of the isochronous data to all of the other terminals, the control station determines in step S7 whether the isochronous data has been successfully received by all of the terminals. Then, if there is any terminal that has not successfully received the isochronous data, broadcast retransmission of the isochronous data to all destination terminals is carried out.

In the first embodiment, the control station sequentially inquires the destination terminals about whether or reception has succeeded. Such inquiries to these terminals can be made in a collective manner. Also, in the first embodiment, upon receiving responses each indicating a reception error from many terminals, the control station sequentially gives retransmission instructions to the respective terminals that have not successfully received the isochronous data. Such retransmission instructions can be made in a collective manner. Described in a third embodiment below is a communications control method which is capable of giving the respective terminals a global inquiry about whether or not reception has succeeded and a global retransmission instruction.

Third Embodiment

Figure 15:
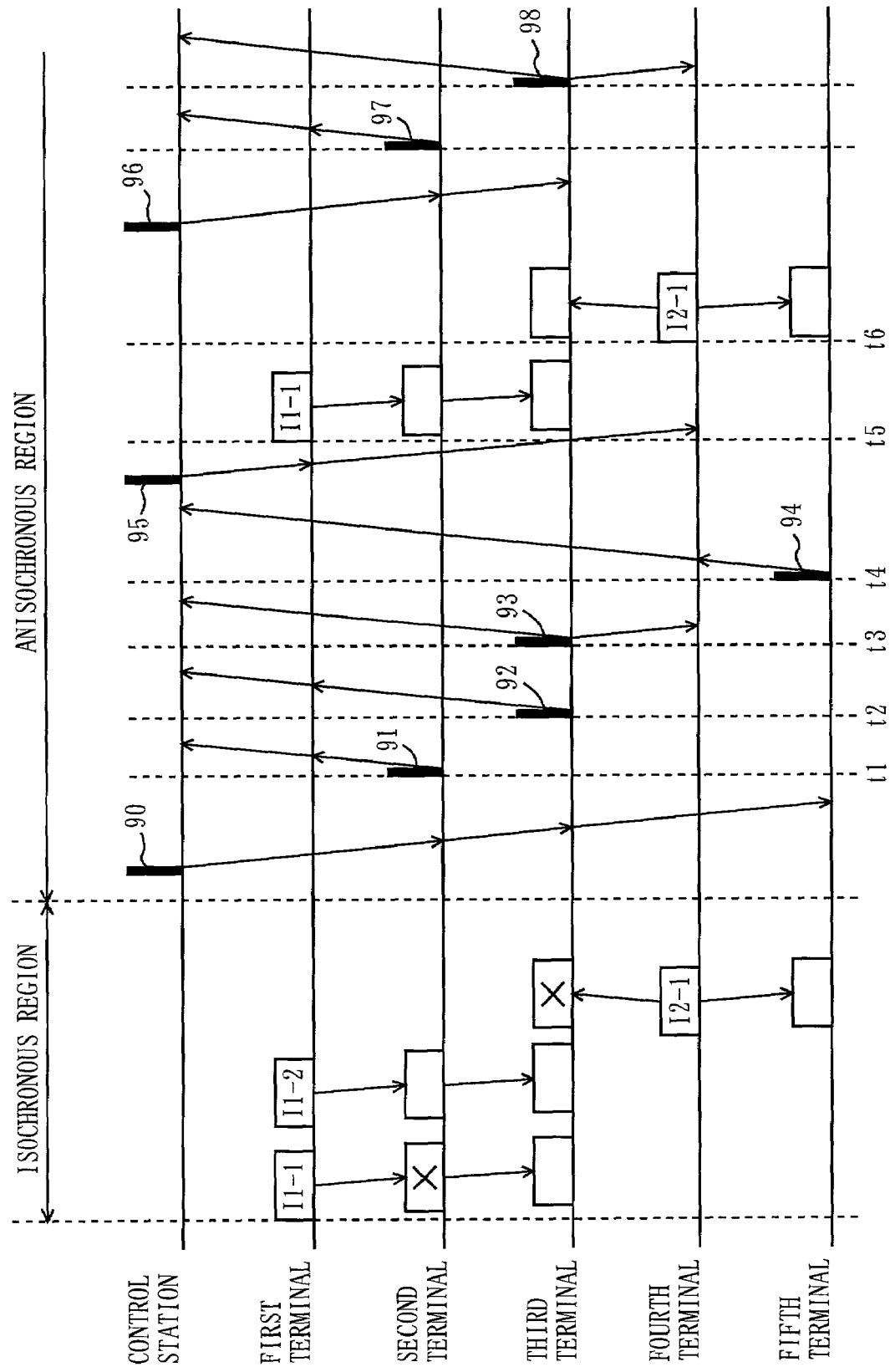
FIG. 15 is a schematic diagram for demonstrating a communications control method according to a third embodiment of the present invention.

FIG. 15 is a schematic diagram for demonstrating a communications control method according to the third embodiment of the present invention. An example of the structure of a wireless local area network to which the method of FIG. 15 is applied is similar to that in FIG. 2 with a fifth terminal (another computer, for example) newly added thereto. The structure of the wireless communications module 20 equipped to the control station and each terminal of FIG. 2 is similar to that shown in FIG. 3. The contents of the program memory 24 of FIG. 3 are similar to those shown in FIG. 4, except that the control terminal program 31 and the terminal program 32 are partly different from those according to the first embodiment.

FIG. 15 shows an example of retransmission control in which inquiries about whether or not reception has succeeded and retransmission instructions are made in a collective manner. In FIG. 15, in the isochronous region, multicast transmission of two isochronous blocks (I1-1 and I1-2) is first carried out from the first terminal to the second and third terminals. Then, multicast transmission of one isochronous block (I2-1) is carried out from the fourth terminal to the third and fifth terminals. In the anisochronous region, the control station first carries out multicast transmission of a packet 90 that includes inquiries to the second, third, and fifth terminals about whether or not reception has succeeded. The contents of the global inquiry packet 90 are shown in FIG. 16.

As shown in FIG. 16, the global inquiry packet 90 describes address of the terminals that should transmit a response packet indicating whether or not reception has succeeded (that is, the second, third, and fifth terminals, which are the destination terminals of the isochronous blocks), "2", "3", and "5", addresses of the terminals that should receive the response packet (that is, the first and fourth terminals, which are the originating terminals of the isochronous blocks), "1" and "4", and times when the response packets should be transmitted, "t1" to "t4".

Referring back to FIG. 15, when receiving the global inquiry packet 90 as shown in FIG. 16, the second, third, and fifth terminals, which are the destination terminals of the isochronous blocks, transmit response packets 91 to 94 at the respective specified times to the control station and the respective specified terminals.

More specifically, in the example shown in FIGS. 15 and 16, the second terminal transmits, at the time "t1", the response packet 91 indicating a reception error of the isochronous block I1-1 and successful reception of the isochronous block I1-2 to the control station and the first terminal.

Then, the third terminal transmits, at the time "t2", the response packet 92 indicating successful reception of two isochronous blocks I1-1 and I1-2 to the control station and the first terminal. Furthermore, the third terminal transmits, at the time "t3", the response packet 93 indicating a reception error of the isochronous block I2-1 to the control station and the fourth terminal.

Then, the fifth terminal transmits, at the time "t4", the response packet 94 indicating successful reception of the isochronous block I2-1 to the control station and the fourth terminal.

When receiving the response packets 91 to 94 from the second, third, and fifth terminals, the control station carries out multicast transmission of a packet 95 for instructing, in a global manner, the originating terminals (first and fourth terminals) to retransmit the isochronous blocks (I1-1 and I2-1) that have not been successfully received. The contents of the global retransmission packet 95 are shown in FIG. 17.

As shown in FIG. 17, the global retransmission instruction packet 95 describes addresses of the terminals that should execute retransmission (first and fourth terminals), "1" and "4", groups that should receive the isochronous data retransmitted by the terminals, "group 1" and "group 2", and times when retransmission should be executed, "t5" and "t6". Here, "group 1" includes the second and third terminals, and "group 2" includes the third and fifth terminals.

Referring back to FIG. 15, when receiving the global retransmission instruction packet 95 as shown in FIG. 17, the first and fourth terminals carry out multicast retransmission of the respective isochronous blocks at the respective specific times to the terminals included in the specified group. That is, the first terminal carries out, at the time "t5", multicast retransmission of the isochronous block I1-1 to the second and third terminals included in "group 1". The fourth terminal carries out, at the time "t6", multicast retransmission of the isochronous block I2-1 to the third and fifth terminals included in "group 2".

Then, the control station carries out multicast transmission of a global inquiry packet 96 for inquiring the second and third terminals, which are the destination terminals, whether or not reception has succeeded. In response, the second terminal first transmits a response packet 97 indicating successful reception to the control station and the first terminal. Then, the third terminal transmits a response packet 98 indicating successful reception to the control station and the fourth terminal.

In the first embodiment, the control station inquires each of the terminals, which are the destination terminals of the isochronous data, about whether or not reception has succeeded. In response, each terminal transmits a response packet. Alternatively, each terminal may spontaneously transmit a response packet upon reception of the isochronous data. Described in a fourth embodiment below is a communication control method in which each terminal spontaneously transmits a response packet upon reception of the isochronous data.

Fourth Embodiment

FIG. 18 is a schematic diagram for demonstrating a communications control method according to the fourth embodiment of the present invention. An example structure of a wireless local area network to which the method of FIG. 18 is applied is similar to that shown in FIG. 2. The structure of the wireless communications module 20 equipped to the control station and each terminal of FIG. 2 is similar to that shown in FIG. 3. The contents of the program memory 24 are similar to those shown in FIG. 4, except that the control station program 31 and the terminal program 32 are partly different from those in the first embodiment.

In FIG. 1, in the anisochronous region, the control station transmits the inquiry packets 42 and 44 to the second and fourth terminals, which are the destination terminals of the isochronous data I1 and I2, respectively. In response to the inquiry, the second and fourth terminals transmit the response packets 43 and 45, respectively.

On the other hand, in FIG. 18, the destination terminal of the isochronous block (the fourth terminal) spontaneously transmits response packets 100 to 102 upon reception of the isochronous blocks (I2-1, I2-2, and I2-3). Therefore, the control station does not have to make inquires in the anisochronous region about whether or not reception has succeeded. Other than the above, FIG. 18 is similar to FIG. 1.

In the first embodiment, the control station reports the dedicated region information to each terminal before the start of transmission. Each terminal transmits the isochronous data at the time described in the reported information. Alternatively, the control station may sequentially instruct the respective terminals about transmission and, in response, each terminal may transmit the isochronous data. Described in a fifth embodiment below is a communication control method of sequentially instructing the respective terminals to transmit the isochronous data.

Fifth Embodiment

Figure 19:
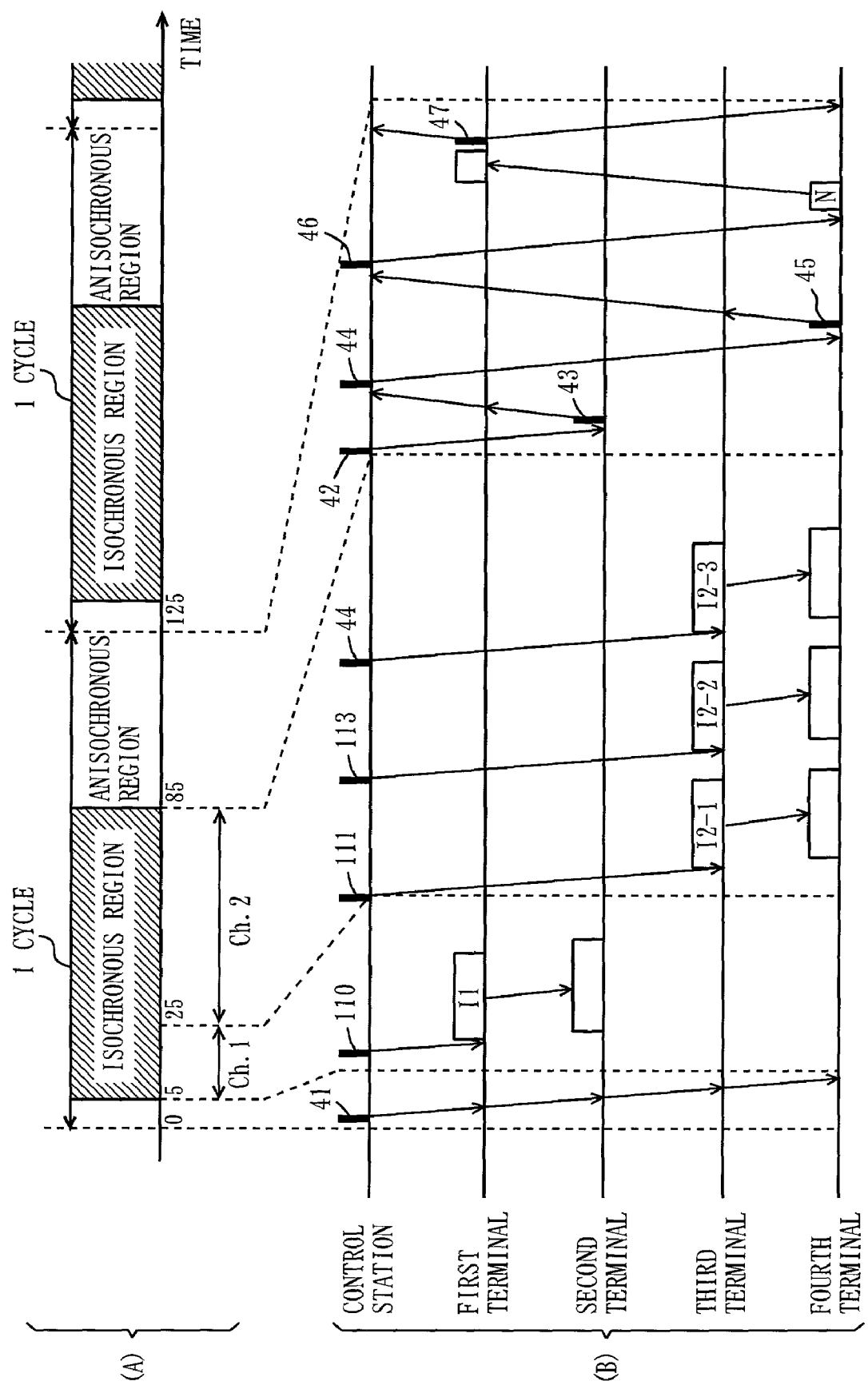
FIG. 19 is a schematic diagram showing a communications control method according to a fifth embodiment of the present invention, where (A) of FIG. 19 illustrates an example of the structure of a communications control cycle and (B) of FIG. 19 illustrates an example of communications control carried out on the network 9 of FIG. 2.

FIG. 19 is a schematic diagram for demonstrating a communications control method according to the fifth embodiment of the present invention. An example of the structure of a wireless local area network to which the method of FIG. 19 is applied is similar to that shown in FIG. 2. The structure of the wireless communications module 20 is similar to that in FIG. 3. The contents of the program memory 24 of FIG. 3 are similar to those shown in FIG. 4, except that the control station program 31 and the terminal program 32 are partly different from those according to the first embodiment.

In FIG. 1, the control station reports the dedicated region information 40 to each terminal before the start of transmission. Each terminal executes transmission of the isochroous data at the time described in the reported information (refer to the first embodiment). On the other hand, in FIG. 19, the control station sequentially transmits transmission instructions to the respective terminals at the times corresponding to the respective dedicated regions. In response, the terminals transmit the isochronous block one after the other.

More specifically, the control station transmits a transmission instruction 110 to the first terminal in timing corresponding to Ch. 1. In response, the first terminal transmits an isochronous block I1. Then, the control station transmits transmission instructions 111, 112, and 113 to the third terminal in timing corresponding to channel 2. In response, the third terminal sequentially transmits isochronous blocks I2-1, I2-2, and I2-3. Other than the above, FIG. 19 is similar to FIG. 1.

The processing that is carried out when the isochronous data (block) has not been successfully received is similar to that shown in FIG. 5 (refer to the first embodiment).

Figure 20:
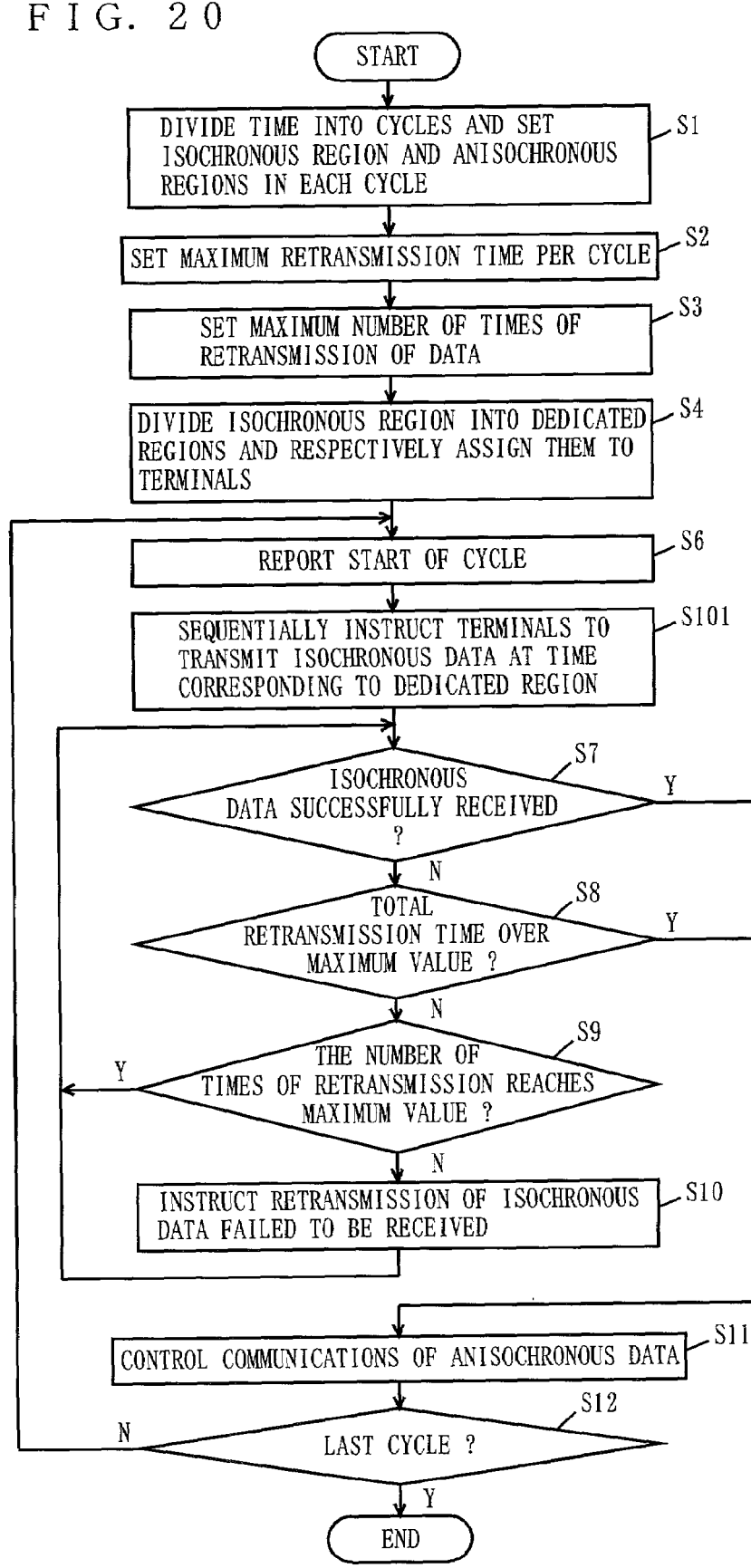
FIG. 20 is a flowchart showing the operation of the control station 10 of FIG. 2 according to the fifth embodiment.

FIG. 20 is a flowchart showing the operation of the control station. The flowchart of FIG. 20 is similar to that of FIG. 7 (refer to the first embodiment), except for the following point. Specifically, in FIG. 7, the control station reports the information about the dedicated region assigned in step S4 to each terminal before the start of transmission (step S5), and then reports the start of the cycle to each terminal (step S6). On the other hand, in FIG. 20, after executing step S4, the control station skips step S5 to execute step S6.

After reporting the start of the cycle to each terminal in step S6, the control station sequentially instructs the respective terminals to transmit the isochronous data at the time corresponding to the dedicated region assigned in step S4 (step S101). In response to the instruction, each of the terminals sequentially transmits the isochronous data. Then, the procedure goes to step S7 and thereafter.

The operation of each terminal is similar to that according to the first embodiment, which is shown in the flowchart of FIG. 9. The details on the data receiving processing shown in step S26 of FIG. 9 are similar to those according to the first embodiment, which are shown in the flowchart of FIG. 10. However, the details on step S22 are partly different from that according to the first embodiment, which are described below.

Figure 21:
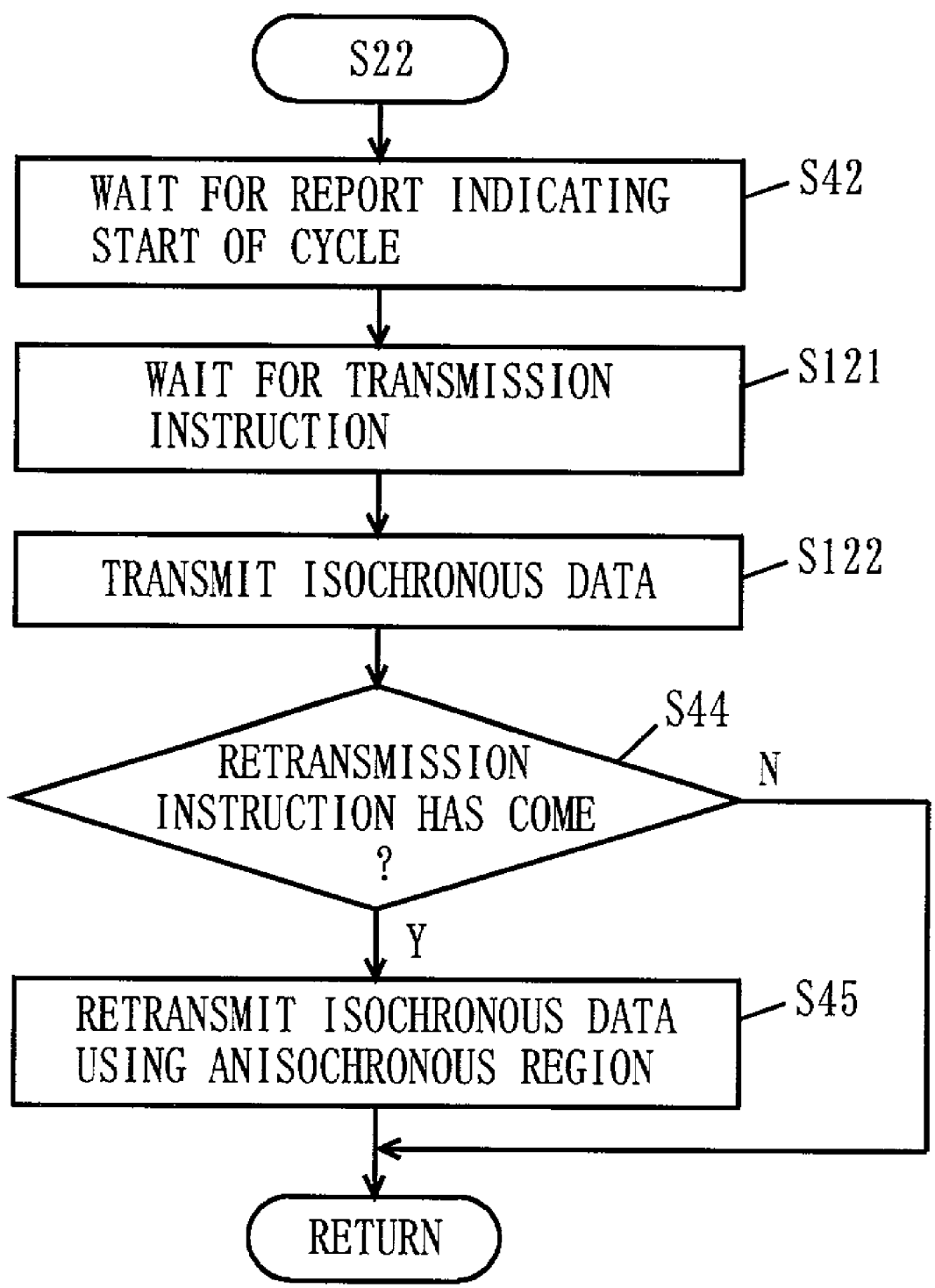
FIG. 21 is a flowchart showing the detailed processing of transmitting isochronous data shown in step S22 of FIG. 9, according to the fifth embodiment.

FIG. 21 is a flowchart showing the details on the isochronous data transmission processing shown in step S22 of FIG. 9. The flowchart of FIG. 21 is similar to that of FIG. 10 (refer to the first embodiment) except for the following. That is, in FIG. 10, the terminal first receives a report of the dedicated region information from the control station (step S41), and waits for a report of the start of the cycle (step S42). After being informed of the start of the cycle, the terminal transmits the isochronous data by using the assigned dedicated region (step S43).

On the other hand, in FIG. 21, step S41 is skipped. The terminal first executes step S42. Then, after being notified of the start of the cycle, the terminal enters in a wait state, waiting for a transmission instruction (step S121). After receiving a transmission instruction from the control station, the terminal transmits the isochronous data (step S122). Then, the procedure goes to step S144 and thereafter.

In the fifth embodiment, the control station inquires each destination terminal of the isochronous data about whether or not reception has succeeded. In response, each terminal transmits a response packet. Alternatively, each terminal may spontaneously transmit a response packet upon receipt of the isochronous data. A communications control method used in such a case is shown in FIG. 22.

Figure 22:
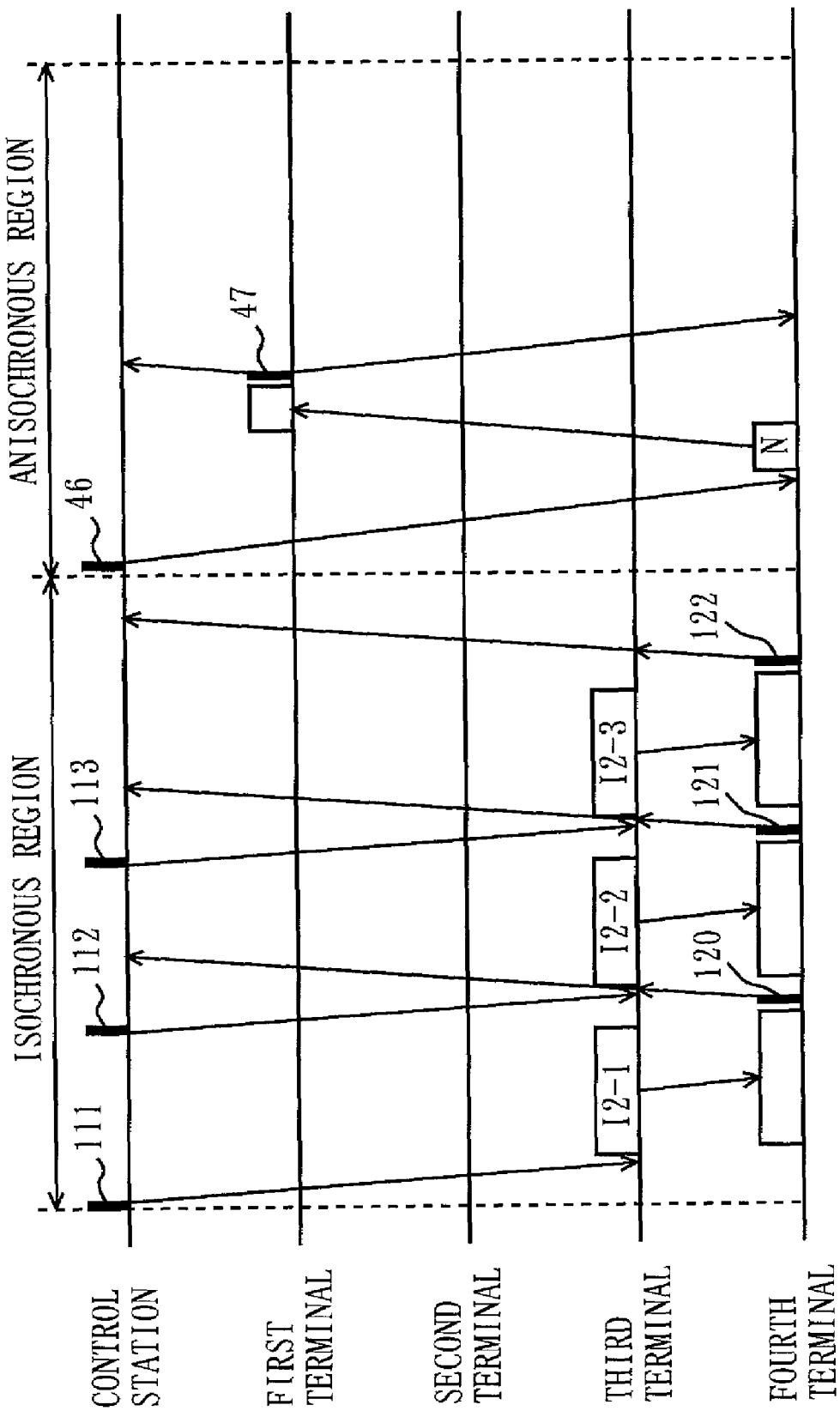
FIG. 22 is a diagram, in relation to (B) of FIG. 19, showing a communications control method of spontaneous transmission of a response packet when each terminal receives isochronous data.

In FIG. 22, upon receiving the isochronous data (I2-1, I2-2, and I2-3), the fourth terminal transmits response packets 120, 121, and 122, respectively. Therefore, the control station does not have to make inquiries about whether or not reception has succeeded in the anisochronous region.

While the present invention has been described in detail, the foregoing description is in all aspects illustrative and not restrictive. It is understood that numerous other modifications and variations can be devised without departing from the scope of the invention.

What is claimed is:

1. A method for controlling communications among a plurality of terminals coupled to each other to form a network in which a mixture of isochronous data and anisochronous data is serially transmitted, said method comprising:
    dividing time into cycles, and providing an isochronous region and an anisochronous region for each cycle;
    determining by a destination terminal, after each terminal transmits, for each cycle, the isochronous data using the isochronous region in a time division manner, whether or not the isochronous data has been successfully received;
    instructing an originating terminal of the isochronous data to retransmit the isochronous data by using the anisochronous region when there is any terminal that has not successfully received the isochronous data; and
    suspending retransmission of the isochronous data even though a reception error is not cleared when a time consumed by one more retransmission presumably exceeds a predetermined maximum time allowed, for each cycle, to be consumed for retransmitting the isochronous data,
    wherein said instructing is carried out repetitively until the isochronous data is successfully received.

2. The communications control method according to claim 1, wherein:
    each terminal encodes and modulates the isochronous data before transmission; and
    in said instructing, the originating terminal is instructed to retransmit the isochronous data after changing a coding rate used in encoding and a modulation scheme used in modulation.

3. The communications control method according to claim 1, further comprising giving an inquiry to the destination terminal about whether or not the isochronous data has been successfully received,
    wherein said determining is carried out based on a response to the inquiry.

4. The communications control method according to claim 1, wherein:
    the destination terminal spontaneously gives a response about whether or not the isochronous data has been successfully received; and
    said determining is carried out based on the response.

5. The communications control method according to claim 1, wherein the maximum time is smaller than or equal to a time length of the anisochronous region.

6. The communications control method according to claim 5, wherein the maximum time is equal in value to a time length of the anisochronous region.

7. The communications control method according to claim 5, further comprising retransmitting, in the anisochronous region of a next cycle, the isochronous data whose retransmission is suspended.

8. The communications control method according to claim 1, further comprising suspending retransmission of the isochronous data even though a reception error is not cleared when the number of times of retransmission exceeds a predetermined maximum number of times of retransmission of the isochronous data.

9. A method for controlling communications among a plurality of terminals coupled to each other to form a network in which a mixture of isochronous data and anisochronous data is serially transmitted, said method comprising:
    dividing time into cycles, and providing an isochronous region and an anisochronous region for each cycle;
    determining by a destination terminal, after each terminal transmits, for each cycle, the isochronous data using the isochronous region in a time division manner, whether or not the isochronous data has been successfully received; and
    instructing an originating terminal of the isochronous data to retransmit the isochronous data by using the anisochronous region when there is any terminal that has not successfully received the isochronous data, wherein:
    each terminal carries out multicast transmission of the isochronous data to the terminals that belong to respective specific groups;
    said determining determines whether or not the isochronous data has been successfully received by all terminals that belong to the group destined to receive the isochronous data; and
    in said instructing, when there is one or more terminals that have not successfully received the isochronous data in the group, the originating terminal is instructed to carry out multicast retransmission of the isochronous data to all of the terminals that belong to the group.

10. The communications control method according to claim 9, wherein:
    each terminal encodes and modulates the isochronous data before transmission; and in said instructing, the originating terminal is instructed to retransmit the isochronous data after changing a coding rate used in encoding and a modulation scheme used in modulation.

11. The communications control method according to claim 9, further comprising giving an inquiry to the destination terminal about whether or not the isochronous data has been successfully received,
wherein said determining is carried out based on a response to the inquiry.

12. The communications control method according to claim 9, wherein:
the destination terminal spontaneously gives a response about whether or not the isochronous data has been successfully received; and
said determining is carried out based on the response.

13. The communications control method according to claim 9, wherein said instructing is carried out repetitively until the isochronous data is successfully received.

14. The communications control method according to claim 13, further comprising suspending retransmission of the isochronous data even though a reception error is not cleared when a time consumed by one more retransmission presumably exceeds a predetermined maximum time allowed, for each cycle, to be consumed for retransmitting the isochronous data.

15. The communications control method according to claim 14, wherein the maximum time is smaller than or equal to a time length of the anisochronous region.

16. The communications control method according to claim 15, further comprising retransmitting, in the anisochronous region of a next cycle, the isochronous data whose retransmission is suspended.

17. The communications control method according to claim 15, wherein the maximum time is equal in value to a time length of the anisochronous region.

18. The communications control method according to claim 13, further comprising suspending retransmission of the isochronous data even though a reception error is not cleared when the number of times of retransmission exceeds a predetermined maximum number of times of retransmission of the isochronous data.

19. A method for controlling communications among a plurality of terminals coupled to each other to form a network in which a mixture of isochronous data and anisochronous data is serially transmitted, said method comprising:
dividing time into cycles, and providing an isochronous region and an anisochronous region for each cycle;
determining by a destination terminal, after each terminal transmits, for each cycle, the isochronous data using the isochronous region in a time division manner, whether or not the isochronous data has been successfully received; and
instructing an originating terminal of the isochronous data to retransmit the isochronous data by using the anisochronous region when there is any terminal that has not successfully received the isochronous data, wherein:
each terminal carries out broadcast transmission of the isochronous data to all other terminals;
said determining determines whether or not the isochronous data has been successfully received by all terminals destined to receive the isochronous data; and
in said instructing, when there is one or more terminals that have not successfully received the isochronous data, the originating terminal is instructed to carry out broadcast retransmission of the isochronous data to all of the terminals.

20. A communications control apparatus for controlling communications among a plurality of terminals coupled to each other to form a network in which a mixture of isochronous data and anisochronous data is serially transmitted, said apparatus comprising:
means for dividing time into cycles, and providing an isochronous region and an anisochronous region for each cycle;
means for, after each terminal transmits, for each cycle, the isochronous data using the isochronous region in a time division manner, determining by a destination terminal whether or not the isochronous data has been successfully received;
means for instructing an originating terminal of the isochronous data to retransmit the isochronous data by using the anisochronous region when there is any terminal that has not successfully received the isochronous data; and
means for suspending retransmission of the isochronous data even though a reception error is not cleared when a time consumed by one more retransmission presumably exceeds a predetermined maximum time allowed, for each cycle, to be consumed for retransmitting the isochronous data,
wherein said instructing means repetitively instructs the originating terminal to retransmit the isochronous data until the isochronous data is successfully received.

21. A program embodied on a computer-readable medium and having instructions operable to cause a computer to perform a method for controlling communications among a plurality of terminals coupled to each other to form a network in which a mixture of isochronous data and anisochronous data is serially transmitted, said method comprising:
dividing time into cycles, and providing an isochronous region and an anisochronous region for each cycle;
determining by a destination terminal, after each terminal transmits, for each cycle, the isochronous data using the isochronous region in a time division manner, whether or not the isochronous data has been successfully received;
instructing an originating terminal of the isochronous data to retransmit the isochronous data by using the anisochronous region when there is any terminal that has not successfully received the isochronous data; and
suspending retransmission of the isochronous data even though a reception error is not cleared when a time consumed by one more retransmission presumably exceeds a predetermined maximum time allowed, for each cycle, to be consumed for retransmitting the isochronous data,
wherein said instructing is carried out repetitively until the isochronous data is successfully received.

22. A recording medium on which a communications control program is recorded, said communications control program having instructions operable to cause a computer to perform a method for controlling communications among a plurality of terminals coupled to each other to form a network in which a mixture of isochronous data and anisochronous data is serially transmitted, said method comprising:

dividing time into cycles, and providing an isochronous region and an anisochronous region for each cycle;

determining by a destination terminal, after each terminal transmits, for each cycle, the isochronous data using the isochronous region in a time division manner, whether or not the isochronous data has been successfully received;

instructing an originating terminal of the isochronous data to retransmit the isochronous data by using the anisochronous region when there is any terminal that has not successfully received the isochronous data; and suspending retransmission of the isochronous data even though a reception error is not cleared when a time consumed by one more retransmission presumably exceeds a predetermined maximum time allowed, for each cycle, to be consumed for retransmitting the isochronous data, wherein said instructing is carried out repetitively until the isochronous data is successfully received.

* * * * *